US011122574B2

(12) United States Patent
Sadiq et al.

(10) Patent No.: US 11,122,574 B2
(45) Date of Patent: Sep. 14, 2021

(54) INDICATION OF ANTENNA COHERENCE FOR PHASE DIFFERENCE OF ARRIVAL AND ANGLE OF DEPARTURE ESTIMATION

(71) Applicant: QUALCOMM Incorporated, San Diego, CA (US)

(72) Inventors: Bilal Sadiq, Basking Ridge, NJ (US); Naga Bhushan, San Diego, CA (US); Junyi Li, Chester, NJ (US); Alexandros Manolakos, San Diego, CA (US); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 20 days.

(21) Appl. No.: 16/534,830

(22) Filed: Aug. 7, 2019

(65) Prior Publication Data

US 2020/0053719 A1 Feb. 13, 2020

(30) Foreign Application Priority Data

Aug. 8, 2018 (GR) .............................. 20180100373

(51) Int. Cl.
*H04W 72/00* (2009.01)
*H04W 72/04* (2009.01)
(Continued)

(52) U.S. Cl.
CPC ......... *H04W 72/048* (2013.01); *H04W 40/04* (2013.01); *H04W 40/12* (2013.01); *H04W 64/003* (2013.01)

(58) Field of Classification Search
CPC ....... H04W 4/02; H04W 4/023; H04W 4/025; H04W 4/026; H04W 4/027; H04W 4/029;
(Continued)

(56) References Cited

U.S. PATENT DOCUMENTS 6,405,047 B1 * 6/2002 Moon ................... G01S 5/0027
342/450
2016/0329953 A1 * 11/2016 Smart .................. H04B 7/0617
(Continued)

FOREIGN PATENT DOCUMENTS

WO 2018100189 A1 6/2018

OTHER PUBLICATIONS

International Search Report and Written Opinion—PCT/US2019/045737—ISA/EPO—dated Jun. 16, 2020.

*Primary Examiner* — Matthew W Genack
(74) *Attorney, Agent, or Firm* — QUALCOMM Incorporated

(57) ABSTRACT

Disclosed are techniques to determine angle of departure (AoD) of signals transmitted from a set of transmission points associated with a transmitter (e.g., a base station, a user equipment (UE)). In an aspect, the set of transmission points are collocated and transmit coherent signals. A receiver (e.g., UE, network entity) determines phase difference of arrivals (PDoAs) of the signals. Based on the PDoAs and locations of the set of transmission points, the AoD can be calculated. When the UE is the receiver, the network entity can send a base station almanac (BSA) message to the UE indicating the set of transmission points and their locations.

30 Claims, 13 Drawing Sheets

(51) Int. Cl.
*H04W 64/00* (2009.01)
*H04W 40/04* (2009.01)
*H04W 40/12* (2009.01)

(58) Field of Classification Search
CPC ......... H04W 56/0035; H04W 56/0065; H04W 64/00; H04W 64/003; H04W 64/006; H04W 72/00; H04W 72/005; H04W 72/048; G01S 3/46; G01S 3/48; G01S 3/50
See application file for complete search history.

(56) References Cited

U.S. PATENT DOCUMENTS

| | | | |
|---|---|---|---|
| 2017/0131381 A1 | 5/2017 | Malik et al. | |
| 2017/0279511 A1* | 9/2017 | Eriksson | H04W 72/0406 |
| 2017/0353913 A1* | 12/2017 | Sun | H04W 48/16 |
| 2018/0083671 A1* | 3/2018 | Alexander | G01S 13/955 |
| 2018/0124584 A1 | 5/2018 | Venkatraman et al. | |
| 2018/0210075 A1 | 7/2018 | Kim et al. | |
| 2018/0310130 A1* | 10/2018 | Kim | G01S 5/0236 |
| 2019/0033420 A1* | 1/2019 | Knaappila | G01S 3/023 |

* cited by examiner

INDICATION OF ANTENNA COHERENCE FOR PHASE DIFFERENCE OF ARRIVAL AND ANGLE OF DEPARTURE ESTIMATION

CROSS-REFERENCE TO RELATED APPLICATION

The present Application for Patent claims priority under 35 U.S.C. § 119 to Greek Patent Application No. 20180100373, entitled "INDICATION OF ANTENNA COHERENCE FOR PHASE DIFFERENCE OF ARRIVAL AND ANGLE OF DEPARTURE ESTIMATION," filed Aug. 8, 2018, assigned to the assignee hereof, and expressly incorporated herein by reference in its entirety.

TECHNICAL FIELD

Various aspects described herein generally relate to wireless communication systems, and more particularly, to indication of antenna coherence for phase difference of arrival (PDoA) and angle of departure (AoD) estimation.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Some wireless communication networks, such as 5G, support operation at very high and even extremely-high frequency (EHF) bands, such as millimeter wave (mmW) frequency bands (generally, wavelengths of 1 mm to 10 mm, or 30 to 300 GHz). These extremely high frequencies may support very high throughput such as up to six gigabits per second (Gbps). One of the challenges for wireless communication at very high or extremely high frequencies, however, is that a significant propagation loss may occur due to the high frequency. As the frequency increases, the wavelength may decrease, and the propagation loss may increase as well. At mmW frequency bands, the propagation loss may be severe. For example, the propagation loss may be on the order of 22 to 27 dB, relative to that observed in either the 2.4 GHz, or 5 GHz bands.

Propagation loss is also an issue in Multiple Input-Multiple Output (MIMO) and massive MIMO systems in any band. The term MIMO as used herein will generally refer to both MIMO and massive MIMO. MIMO is a method for multiplying the capacity of a radio link by using multiple transmit and receive antennas to exploit multipath propagation. Multipath propagation occurs because radio frequency (RF) signals not only travel by the shortest path between the transmitter and receiver, which may be a line of sight (LOS) path, but also over a number of other paths as they spread out from the transmitter and reflect off other objects such as hills, buildings, water, and the like on their way to the receiver. A transmitter in a MIMO system includes multiple antennas and takes advantage of multipath propagation by directing these antennas to each transmit the same RF signals on the same radio channel to a receiver. The receiver is also equipped with multiple antennas tuned to the radio channel that can detect the RF signals sent by the transmitter. As the RF signals arrive at the receiver (some RF signals may be delayed due to the multipath propagation), the receiver can combine them into a single RF signal. Because the transmitter sends each RF signal at a lower power level than it would send a single RF signal, propagation loss is also an issue in a MIMO system.

To address propagation loss issues in mmW band systems and MIMO systems, transmitters may use beamforming to extend RF signal coverage. In particular, transmit beamforming is a technique for emitting an RF signal in a specific direction, whereas receive beamforming is a technique used to increase receive sensitivity of RF signals that arrive at a receiver along a specific direction. Transmit beamforming and receive beamforming may be used in conjunction with each other or separately, and references to "beamforming" may hereinafter refer to transmit beamforming, receive beamforming, or both. Traditionally, when a transmitter broadcasts an RF signal, it broadcasts the RF signal in nearly all directions determined by the fixed antenna pattern or radiation pattern of the antenna. With beamforming, the transmitter determines where a given receiver is located relative to the transmitter and projects a stronger downlink RF signal in that specific direction, thereby providing a faster (in terms of data rate) and stronger RF signal for the receiver. To change the directionality of the RF signal when transmitting, a transmitter can control the phase and relative amplitude of the RF signal broadcasted by each antenna. For example, a transmitter may use an array of antennas (also referred to as a "phased array" or an "antenna array") that creates a beam of RF waves that can be "steered" to point in different directions, without actually moving the antennas. Specifically, the RF current is fed to the individual antennas with the correct phase relationship so that the radio waves from the separate antennas add together to increase the radiation in a desired direction, while cancelling the radio waves from the separate antennas to suppress radiation in undesired directions.

To support position estimations in terrestrial wireless networks, a mobile device can be configured to measure and report the observed time difference of arrival (OTDOA) or reference signal timing difference (RSTD) between reference RF signals received from two or more network nodes (e.g., different base stations or different transmission points (e.g., antennas) belonging to the same base station).

Where a transmitter uses beamforming to transmit RF signals, the beams of interest for data communication between the transmitter and receiver will be the beams carrying RF signals having the highest received signal strength (or highest received Signal to Noise plus Interference Ratio (SINR), for example, in the presence of a directional interfering signal). However, the receiver's ability to perform certain tasks may suffer when the receiver relies upon the beam with the highest received signal strength. For example, in a scenario where the beam with the highest received signal strength travels over a non-LOS (NLOS) path that is longer than the shortest path (i.e., a LOS path or a shortest NLOS path), the RF signals may arrive later than RF signal(s) received over the shortest path due to propagation delay. Accordingly, if the receiver is performing a task that requires precise timing measurements and the beam with the highest received signal strength is affected by longer propagation delay, then the beam with the highest received signal strength may not be optimal for the task at hand.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

An aspect is directed to a first node comprising a memory, a receiver, and a processor coupled to the memory and the receiver. The processor may be configured to receive, from a network entity through the receiver, an almanac message indicating a set of transmission points associated with a second node. The set of transmission points may be collocated and configured to transmit coherent signals. The processor may also be configured to receive, through the receiver, the coherent signals transmitted from at least two transmission points of the set of transmission points of the second node. The processor may further be configured to determine one or more phase difference of arrivals (PDoAs) among the received coherent signals. Between any two transmission points in the set of transmission points, signals transmitted from the two transmission points may be distinguishable from each other in a time domain, a frequency domain, a code domain, or any combination thereof.

An aspect is directed to a network entity comprising a memory, a communication interface, and a processor coupled to the memory and the communication interface. The processor may be configured to provide, to a first node through the communication interface, an almanac message indicating a set of transmission points associated with a second node. The set of transmission points may be collocated and configured to transmit coherent signals. Between any two transmission points in the set of transmission points, signals transmitted from the two transmission points may be distinguishable from each other in a time domain, a frequency domain, a code domain, or any combination thereof.

An aspect is directed to a method of operating a first node. The method may comprise receiving, from a network entity, an almanac message indicating a set of transmission points associated with a second node. The set of transmission points may be collocated and configured to transmit coherent signals. The method may also comprise receiving the coherent signals transmitted from at least two transmission points of the set of transmission points of the second node. The method may further comprise determining one or more phase difference of arrivals (PDoAs) among the received coherent signals. Between any two transmission points in the set of transmission points, signals transmitted from the two transmission points may be distinguishable from each other in a time domain, a frequency domain, a code domain, or any combination thereof.

An aspect is directed to a method of operating a network entity. The method may comprise providing, to a first node, an almanac message indicating a set of transmission points associated with a second node. The set of transmission points may be collocated and configured to transmit coherent signals. Between any two transmission points in the set of transmission points, signals transmitted from the two transmission points may be distinguishable from each other in a time domain, a frequency domain, a code domain, or any combination thereof.

An aspect is directed to a first node. The first node may comprise means for receiving, from a network entity, an almanac message indicating a set of transmission points associated with a second node. The set of transmission points may be collocated and configured to transmit coherent signals. The first node may also comprise means for receiving the coherent signals transmitted from at least two transmission points of the set of transmission points of the second node. The first node may further comprise means for determining one or more phase difference of arrivals (PDoAs) among the received coherent signals. Between any two transmission points in the set of transmission points, signals transmitted from the two transmission points may be distinguishable from each other in a time domain, a frequency domain, a code domain, or any combination thereof.

An aspect is directed to a network entity. The network entity may comprise means for providing, to a first node, an almanac message indicating a set of transmission points associated with a second node. The set of transmission points may be collocated and configured to transmit coherent signals. Between any two transmission points in the set of transmission points, signals transmitted from the two transmission points may be distinguishable from each other in a time domain, a frequency domain, a code domain, or any combination thereof.

An aspect is directed to a non-transitory computer-readable medium containing instructions executable by a first node being stored thereon. The instructions cause the first node to receive, from a network entity, an almanac message indicating a set of transmission points associated with a second node. The set of transmission points may be collocated and configured to transmit coherent signals. The instructions may also cause the first node to receive the coherent signals transmitted from at least two transmission points of the set of transmission points of the second node. The instructions may further cause the first node to determine one or more phase difference of arrivals (PDoAs) among the received coherent signals. Between any two transmission points in the set of transmission points, signals transmitted from the two transmission points may be distinguishable from each other in a time domain, a frequency domain, a code domain, or any combination thereof.

An aspect is directed to a non-transitory computer-readable medium containing instructions executable by a network entity being stored thereon. The instructions may cause the network entity to provide, to a first node, an almanac message indicating a set of transmission points associated with a second node. The set of transmission points may be collocated and configured to transmit coherent signals. Between any two transmission points in the set of transmission points, signals transmitted from the two transmission points may be distinguishable from each other in a time domain, a frequency domain, a code domain, or any combination thereof.

Other objects and advantages associated with the aspects disclosed herein will be apparent to those skilled in the art based on the accompanying drawings and detailed description.

BRIEF DESCRIPTION OF THE DRAWINGS

A more complete appreciation of the various aspects described herein and many attendant advantages thereof will be readily obtained as the same becomes better understood by reference to the following detailed description when considered in connection with the accompanying drawings which are presented solely for illustration and not limitation, and in which.

DETAILED DESCRIPTION

Figure 1:
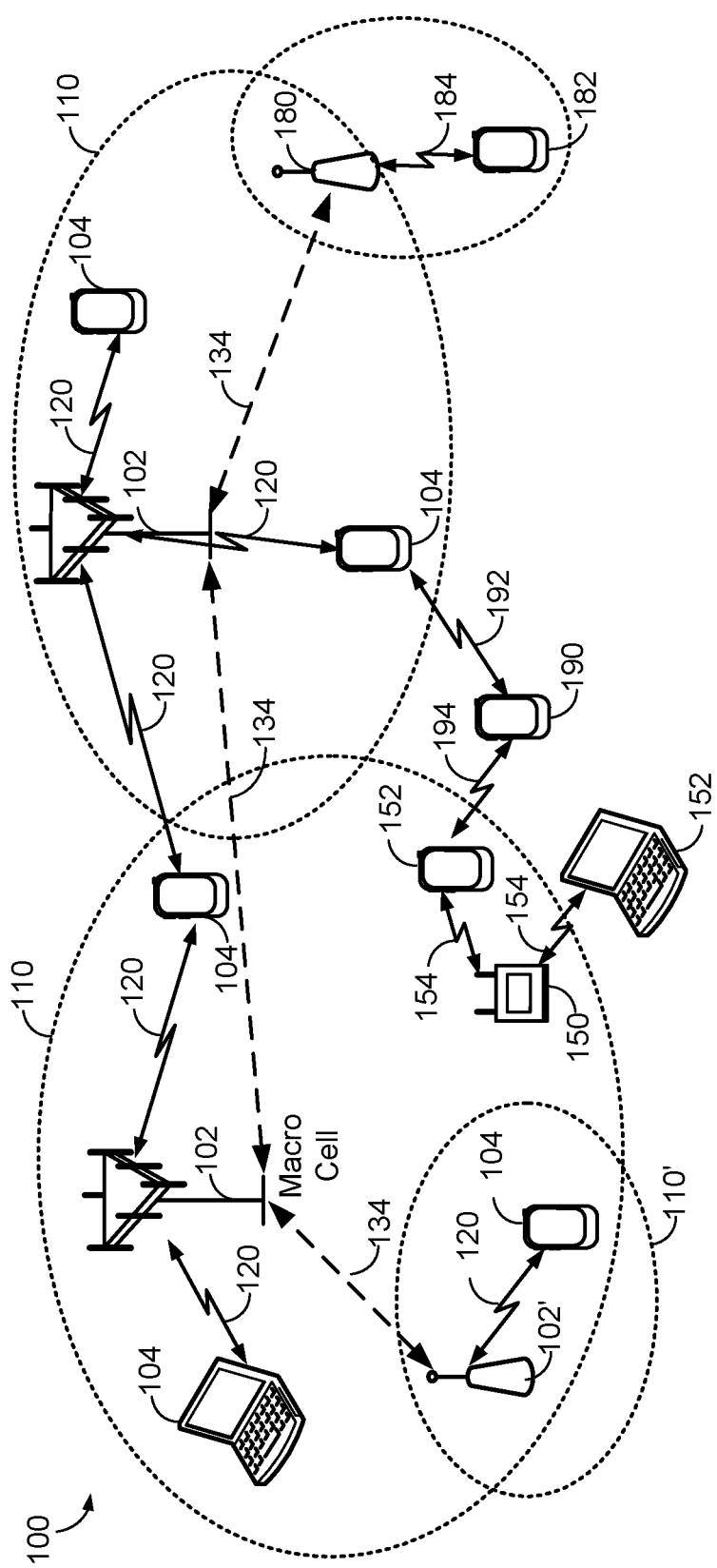
FIG. 1 illustrates an exemplary wireless communications system according to various aspects.

Various aspects described herein generally relate to wireless communication systems, and more particularly, to phase difference of arrival (PDoA) and angle of departure (AoD) estimation. In an aspect, a network entity (e.g., location server, base station) may provide an almanac message, (e.g., a base station almanac (BSA)), to a first node (e.g., UE). The almanac message may indicate a set of transmission points associated with a second node (e.g., base station), and the first node may perform measurements on the signal transmitted from the set of transmission points. In particular, the first node may determine the PDoAs of the signals. The first node may further determine or estimate AoDs of the signals based on the PDoAs and/or may provide the PDoAs to the network entity.

These and other aspects are disclosed in the following description and related drawings to show specific examples relating to exemplary aspects. Alternate aspects will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects disclosed herein.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage, or mode of operation.

The terminology used herein describes particular aspects only and should not be construed to limit any aspects disclosed herein. As used herein, the singular forms "a," "an," and "the" are intended to include the plural forms as well, unless the context clearly indicates otherwise. Those skilled in the art will further understand that the terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof.

Further, various aspects may be described in terms of sequences of actions to be performed by, for example, elements of a computing device. Those skilled in the art will recognize that various actions described herein can be performed by specific circuits (e.g., an application specific integrated circuit (ASIC)), by program instructions being executed by one or more processors, or by a combination of both. Additionally, these sequences of actions described herein can be considered to be embodied entirely within any form of non-transitory computer-readable medium having stored thereon a corresponding set of computer instructions that upon execution would cause an associated processor to perform the functionality described herein. Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to" and/or other structural components configured to perform the described action.

As used herein, the terms "user equipment" (or "UE"), "user device," "user terminal," "client device," "communication device," "wireless device," "wireless communications device," "handheld device," "mobile device," "mobile terminal," "mobile station," "handset," "access terminal," "subscriber device," "subscriber terminal," "subscriber station," "terminal," and variants thereof may interchangeably refer to any suitable mobile or stationary device that can receive wireless communication and/or navigation signals. These terms are also intended to include devices which communicate with another device that can receive wireless communication and/or navigation signals such as by short-range wireless, infrared, wireline connection, or other connection, regardless of whether satellite signal reception, assistance data reception, and/or position-related processing occurs at the device or at the other device. In addition, these terms are intended to include all devices, including wireless and wireline communication devices, that can communicate with a core network via a radio access network (RAN), and through the core network the UEs can be connected with external networks such as the Internet and with other UEs. Of course, other mechanisms of connecting to the core network and/or the Internet are also possible for the UEs, such as over a wired access network, a wireless local area network (WLAN) (e.g., based on IEEE 802.11, etc.) and so on. UEs can be embodied by any of a number of types of devices including but not limited to printed circuit (PC) cards, compact flash devices, external or internal modems, wireless or wireline phones, smartphones, tablets, tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cells (high power cellular base stations) and/or small cells (low power cellular base stations), wherein the macro cells may include Evolved NodeBs (eNBs), where the wireless communications system 100 corresponds to an LTE network, or gNodeBs (gNBs), where the wireless communications system 100 corresponds to a 5G network or a combination of both, and the small cells may include femtocells, picocells, microcells, etc.

The base stations 102 may collectively form a Radio Access Network (RAN) and interface with an Evolved Packet Core (EPC) or Next Generation Core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors, each cell corresponding to a single antenna or array of antennas of a base station 102. As used herein, the term "cell" or "sector" may correspond to one of a plurality of cells of a base station 102, or to the base station 102 itself, depending on the context.

While neighboring macro cell geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cells may be known as a heterogeneous network. A heterogeneous network may also include Home eNBs (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth, and so on.

Figure 2A:
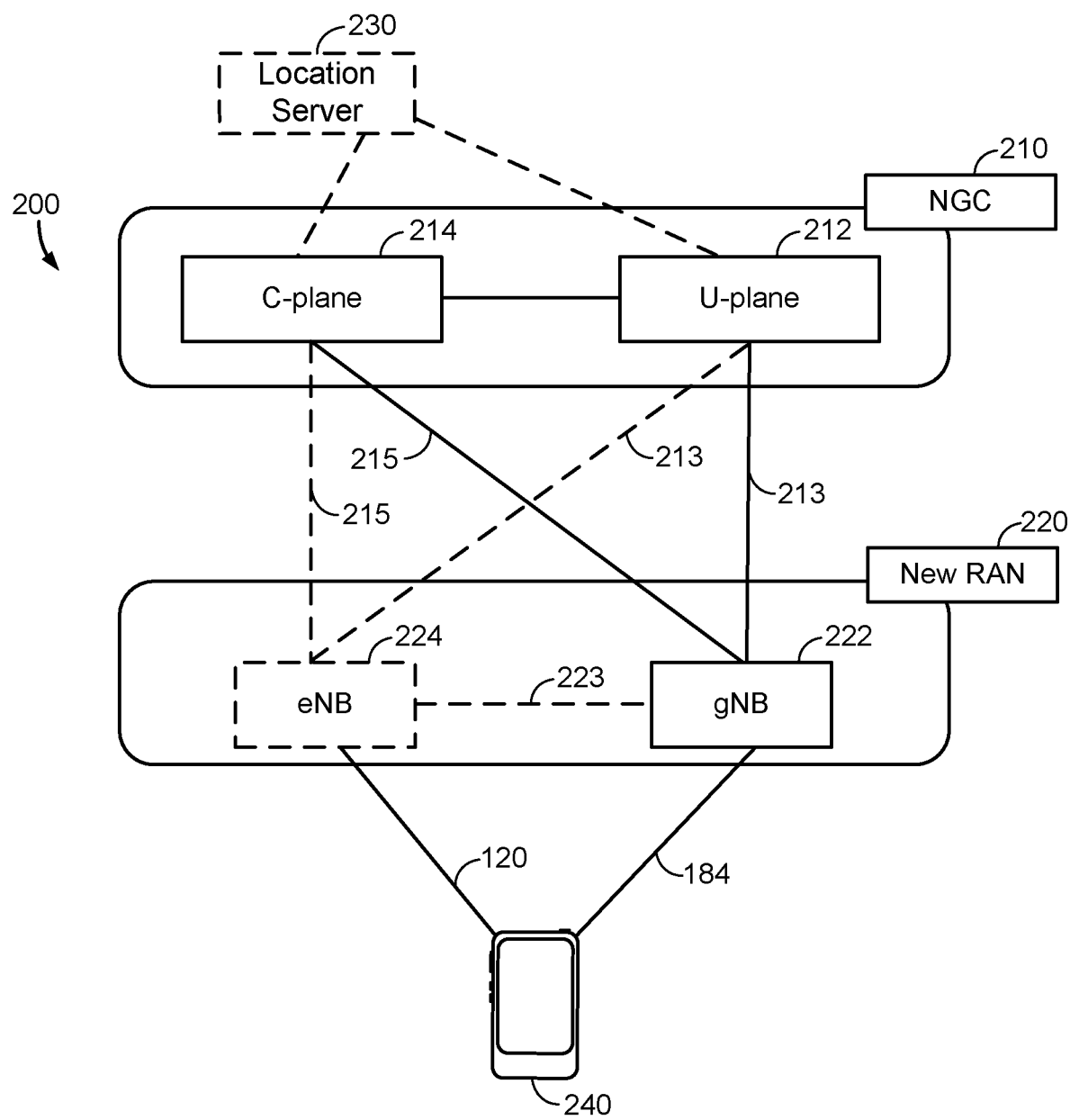
FIGS. 2A and 2B illustrate example wireless network structures according to various aspects.

According to various aspects, FIG. 2A illustrates an example wireless network structure 200. For example, a Next Generation Core (NGC) 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 240 (e.g., any of the UEs depicted in FIG. 1, such as UEs 104, UE 182, UE 190, etc.). Another optional aspect may include Location Server 230 which may be in communication with the NGC 210 to provide location assistance for UEs 240. The location server 230 can be implemented as a plurality of structurally separate servers, or alternately may each correspond to a single server. The location server 230 can be configured to support one or more location services for UEs 240 that can connect to the location server 230 via the core network, NGC 210, and/or via the Internet (not illustrated). Further, the location server 230 may be integrated into a component of the core network, or alternatively may be external to the core network.

Figure 2B:
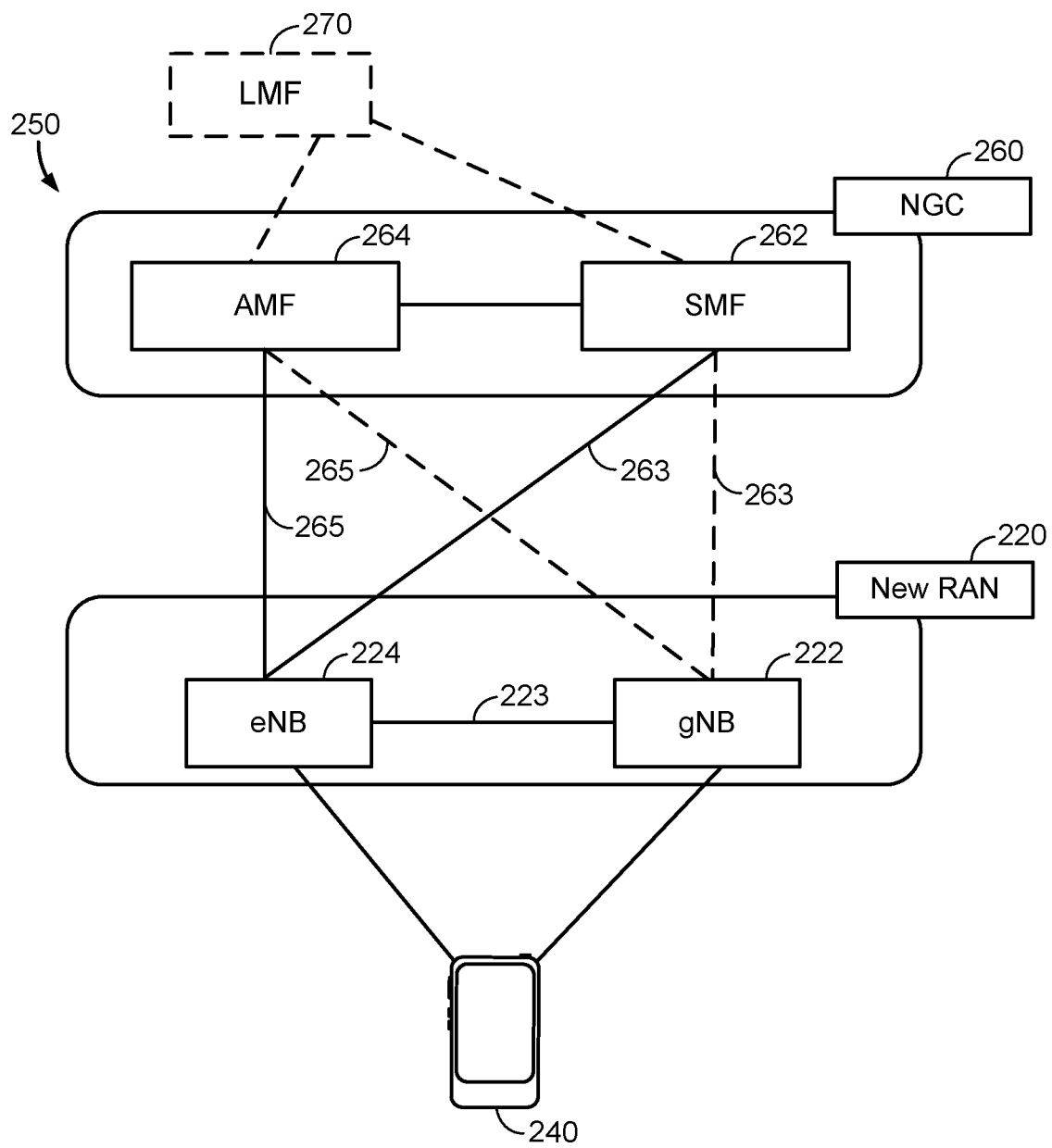

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3A:
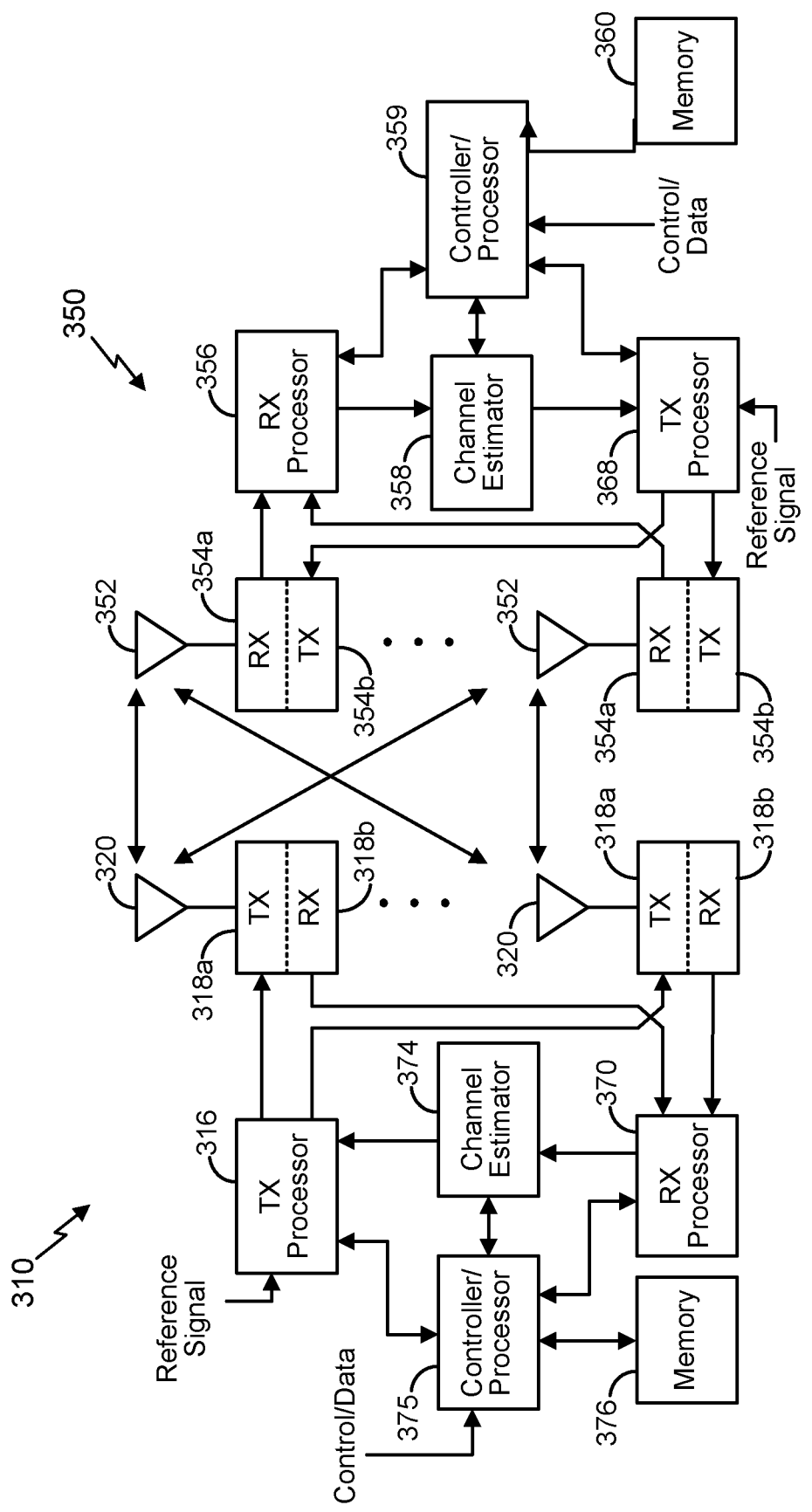
FIG. 3A illustrates an exemplary base station and an exemplary UE in an access network according to various aspects.

According to various aspects, FIG. 3A illustrates an exemplary base station 310 (e.g., an eNB, a gNB, a small cell AP, a WLAN AP, etc.) in communication with an exemplary UE 350 in a wireless network. In the DL, IP packets from the core network (NGC 210/EPC 260) may be provided to a controller/processor 375. The controller/processor 375 implements functionality for a radio resource control (RRC) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmit (TX) processor 316 and the receive (RX) processor 370 implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to one or more different antennas 320 via a separate transmitter 318a. Each transmitter 318a may modulate an RF carrier with a respective spatial stream for transmission.

At the UE 350, each receiver 354a receives a signal through its respective antenna 352. Each receiver 354a recovers information modulated onto an RF carrier and provides the information to the RX processor 356. The TX processor 368 and the RX processor 356 implement Layer-1 functionality associated with various signal processing functions.

The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and de-interleaved to recover the data and control signals that were originally transmitted by the base station 310 on the physical channel. The data and control signals are then provided to the controller/processor 359, which implements Layer-3 and Layer-2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the core network. The controller/processor 359 is also responsible for error detection.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354*b*. Each transmitter 354*b* may modulate an RF carrier with a respective spatial stream for transmission.

The UL transmission is processed at the base station 310 in a manner similar to that described in connection with the receiver function at the UE 350. Each receiver 318*b* receives a signal through its respective antenna 320. Each receiver 318*b* recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the core network. The controller/processor 375 is also responsible for error detection.

Figure 3B:
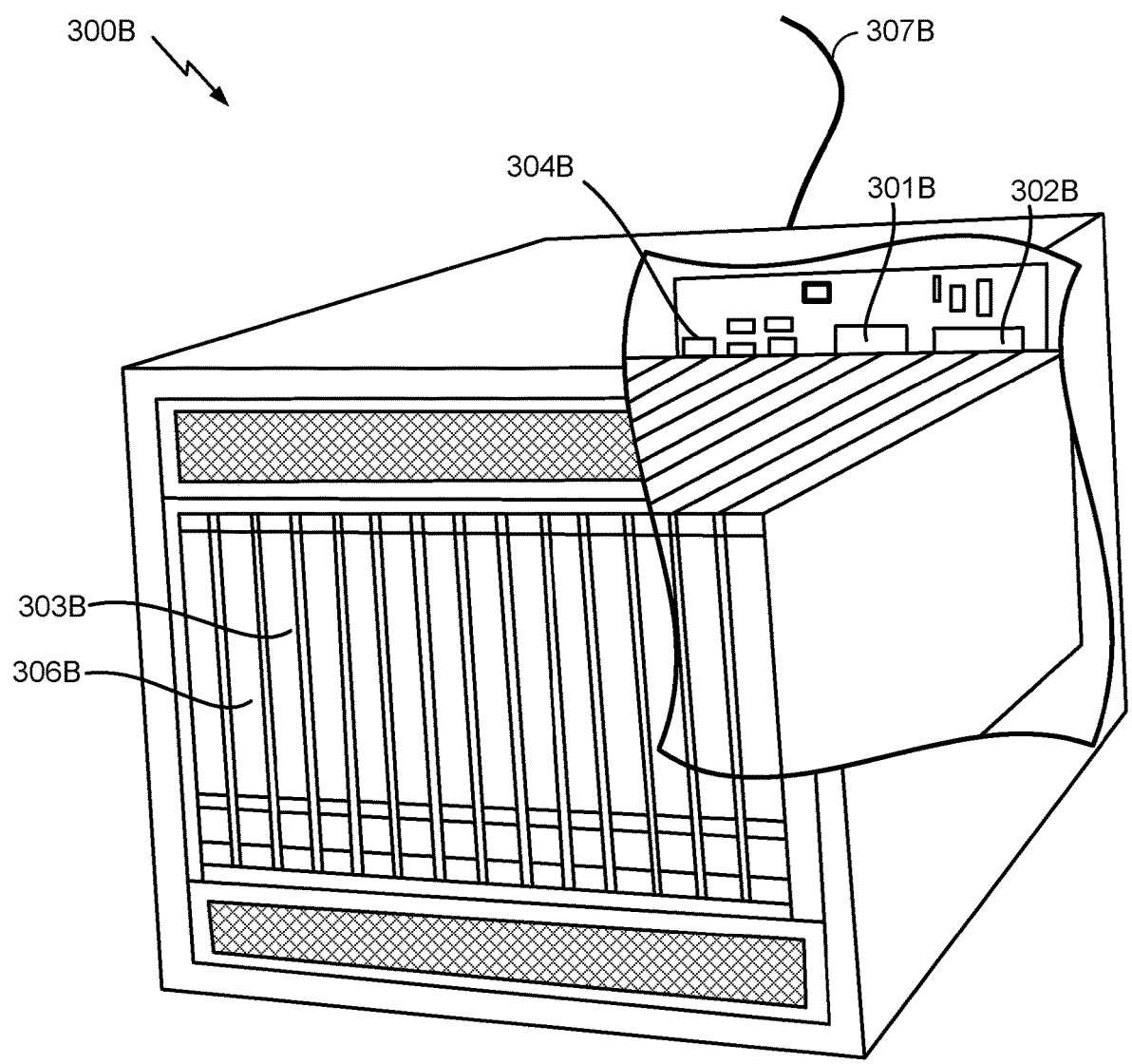
FIG. 3B illustrates an exemplary server according to various aspects.

FIG. 3B illustrates an exemplary server 300B. In an example, the server 300B may correspond to an example configuration of the location server 230 described above.

The server 300B includes a processor 301B coupled to volatile memory 302B and a large capacity nonvolatile memory, such as a disk drive 303B. The server 300B may also include a floppy disc drive, compact disc (CD) or DVD disc drive 306B coupled to the processor 301B. The server 300B may also include network access ports 304B coupled to the processor 301B for establishing data connections with a network 307B, such as a local area network coupled to other broadcast system computers and servers or to the Internet.

Figure 4:
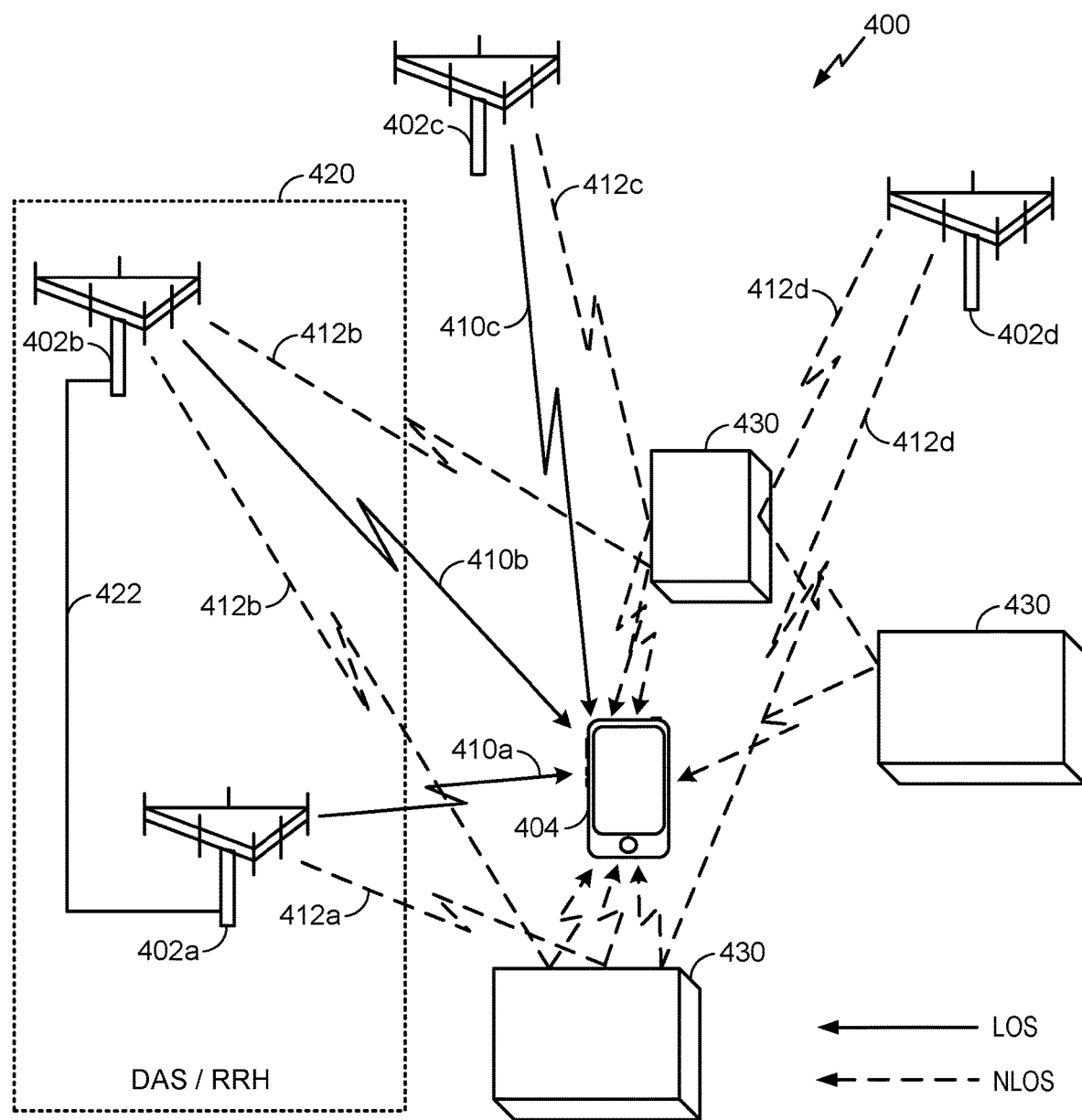
FIG. 4 illustrates an exemplary wireless communications system according to various aspects.

FIG. 4 illustrates an exemplary wireless communications system 400 according to various aspects of the disclosure. In the example of FIG. 4, a UE 404, which may correspond to any of the UEs described above with respect to FIG. 1 (e.g., UEs 104, UE 182, UE 190, etc.), is attempting to calculate an estimate of its position, or assist another entity (e.g., a base station or core network component, another UE, a location server, a third party application, etc.) to calculate an estimate of its position. The UE 404 may communicate wirelessly with a plurality of base stations 402*a-d* (collectively, base stations 402), which may correspond to any combination of base stations 102 or 180 and/or WLAN AP 150 in FIG. 1, using RF signals and standardized protocols for the modulation of the RF signals and the exchange of information packets. By extracting different types of information from the exchanged RF signals, and utilizing the layout of the wireless communications system 400 (i.e., the base stations locations, geometry, etc.), the UE 404 may determine its position, or assist in the determination of its position, in a predefined reference coordinate system. In an aspect, the UE 404 may specify its position using a two-dimensional coordinate system; however, the aspects disclosed herein are not so limited, and may also be applicable to determining positions using a three-dimensional coordinate system, if the extra dimension is desired. Additionally, while FIG. 4 illustrates one UE 404 and four base stations 402, as will be appreciated, there may be more UEs 404 and more or fewer base stations 402.

To support position estimates, the base stations 402 may be configured to broadcast reference RF signals (e.g., Positioning Reference Signals (PRS), Cell-specific Reference Signals (CRS), Channel State Information Reference Signals (CSI-RS), synchronization signals, etc.) to UEs 404 in their coverage area to enable a UE 404 to measure reference RF signal timing differences (e.g., OTDOA or RSTD) between pairs of network nodes and/or to identify the beam that best excite the LOS or shortest radio path between the UE 404 and the transmitting base stations 402. Identifying the LOS/shortest path beam(s) is of interest not only because these beams can subsequently be used for OTDOA measurements between a pair of base stations 402, but also because identifying these beams can directly provide some positioning information based on the beam direction. Moreover, these beams can subsequently be used for other position estimation methods that require precise ToA, such as round-trip time estimation based methods.

As used herein, a "network node" may be a base station 402, a cell of a base station 402, a remote radio head, an antenna of a base station 402, where the locations of the antennas of a base station 402 are distinct from the location of the base station 402 itself, or any other network entity capable of transmitting reference signals. Further, as used herein, a "node" may refer to either a network node or a UE.

A location server (e.g., location server 230) may send assistance data to the UE 404 that includes an identification of one or more neighbor cells of base stations 402 and configuration information for reference RF signals transmitted by each neighbor cell. Alternatively, the assistance data can originate directly from the base stations 402 themselves (e.g., in periodically broadcasted overhead messages, etc.). Alternatively, the UE 404 can detect neighbor cells of base stations 402 itself without the use of assistance data. The UE 404 (e.g., based in part on the assistance data, if provided) can measure and (optionally) report the OTDOA from individual network nodes and/or RSTDs between reference RF signals received from pairs of network nodes. Using these measurements and the known locations of the measured network nodes (i.e., the base station(s) 402 or antenna (s) that transmitted the reference RF signals that the UE 404 measured), the UE 404 or the location server can determine the distance between the UE 404 and the measured network nodes and thereby calculate the location of the UE 404.

The term "position estimate" is used herein to refer to an estimate of a position for a UE 404, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "location estimate," a "fix estimate," or by some other term. The means of obtaining a location estimate may be referred to generically as "positioning," "locating," or "position fixing." A particular solution for obtaining a position estimate may be referred to as a "position solution." A particular method for obtaining a position estimate as part of a position solution may be referred to as a "position method" or as a "positioning method."

The term "base station" may refer to a single physical transmission point or to multiple physical transmission points that may or may not be co-located. For example, where the term "base station" refers to a single physical transmission point, the physical transmission point may be an antenna of the base station (e.g., base station 402) corresponding to a cell of the base station. Where the term "base station" refers to multiple co-located physical transmission points, the physical transmission points may be an array of antennas (e.g., as in a MIMO system or where the base station employs beamforming) of the base station. Where the term "base station" refers to multiple non-co-located physical transmission points, the physical transmission points may be a Distributed Antenna System (DAS) (a network of spatially separated antennas connected to a common source via a transport medium) or a Remote Radio Head (RRH) (a remote base station connected to a serving base station). Alternatively, the non-co-located physical transmission points may be the serving base station receiving the measurement report from the UE (e.g., UE 404) and a neighbor base station whose reference RF signals the UE is measuring. Thus, FIG. 4 illustrates an aspect in which base stations 402a and 402b form a DAS/RRH 420. For example, the base station 402a may be the serving base station of the UE 404 and the base station 402b may be a neighbor base station of the UE 404. As such, the base station 402b may be the RRH of the base station 402a. The base stations 402a and 402b may communicate with each other over a wired or wireless link 422.

To accurately determine the position of the UE 404 using the OTDOAs and/or RSTDs between RF signals received from pairs of network nodes, the UE 404 needs to measure the reference RF signals received over the LOS path (or the shortest NLOS path where an LOS path is not available), between the UE 404 and a network node (e.g., base station 402, antenna). However, RF signals travel not only by the LOS/shortest path between the transmitter and receiver, but also over a number of other paths as the RF signals spread out from the transmitter and reflect off other objects such as hills, buildings, water, and the like on their way to the receiver. Thus, FIG. 4 illustrates a number of LOS paths 410 and a number of NLOS paths 412 between the base stations 402 and the UE 404. Specifically, FIG. 4 illustrates base station 402a transmitting over an LOS path 410a and an NLOS path 412a, base station 402b transmitting over an LOS path 410b and two NLOS paths 412b, base station 402c transmitting over an LOS path 410c and an NLOS path 412c, and base station 402d transmitting over two NLOS paths 412d. As illustrated in FIG. 4, each NLOS path 412 reflects off some object 430 (e.g., a building). As will be appreciated, each LOS path 410 and NLOS path 412 transmitted by a base station 402 may be transmitted by different antennas of the base station 402 (e.g., as in a MIMO system), or may be transmitted by the same antenna of a base station 402 (thereby illustrating the propagation of an RF signal). Further, as used herein, the term "LOS path" refers to the shortest path between a transmitter and receiver, and may not be an actual LOS path, but rather, the shortest NLOS path.

Each LOS path 410 and NLOS path 412 represents the path followed by an RF signal.

An "RF signal" comprises an electromagnetic wave that transports information through the space between the transmitter and the receiver. As illustrated in FIG. 4 and as described further below, the receiver (e.g., UE 404) may receive multiple "RF signals" corresponding to each transmitted RF signal due to the propagation characteristics of RF signals through multipath channels. More specifically, when a transmitter (e.g., a base station 402) transmits an RF signal, the RF signal received at the receiver (e.g., UE 404) is the sum or accumulation of the RF signals received over multiple paths. For example, the UE 404 may combine the RF signals received over the LOS path 410c and the NLOS path 412c into a single RF signal. Since signal paths may have different lengths and arrive at the receiver from different directions, as illustrated in FIG. 4, the RF signal from each path is accordingly delayed and arrives at a certain angle. This directional effect is more pronounced at higher frequencies, such as mmW.

In receive beamforming, the receiver uses a receive beam to amplify RF signals detected on a given channel. For example, the receiver can increase the gain setting and/or adjust the phase setting of an array of antennas (e.g., antennas 352 in FIG. 3) in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., RSRP, SINR, etc.) of the RF signals received from that direction.

Figure 5:
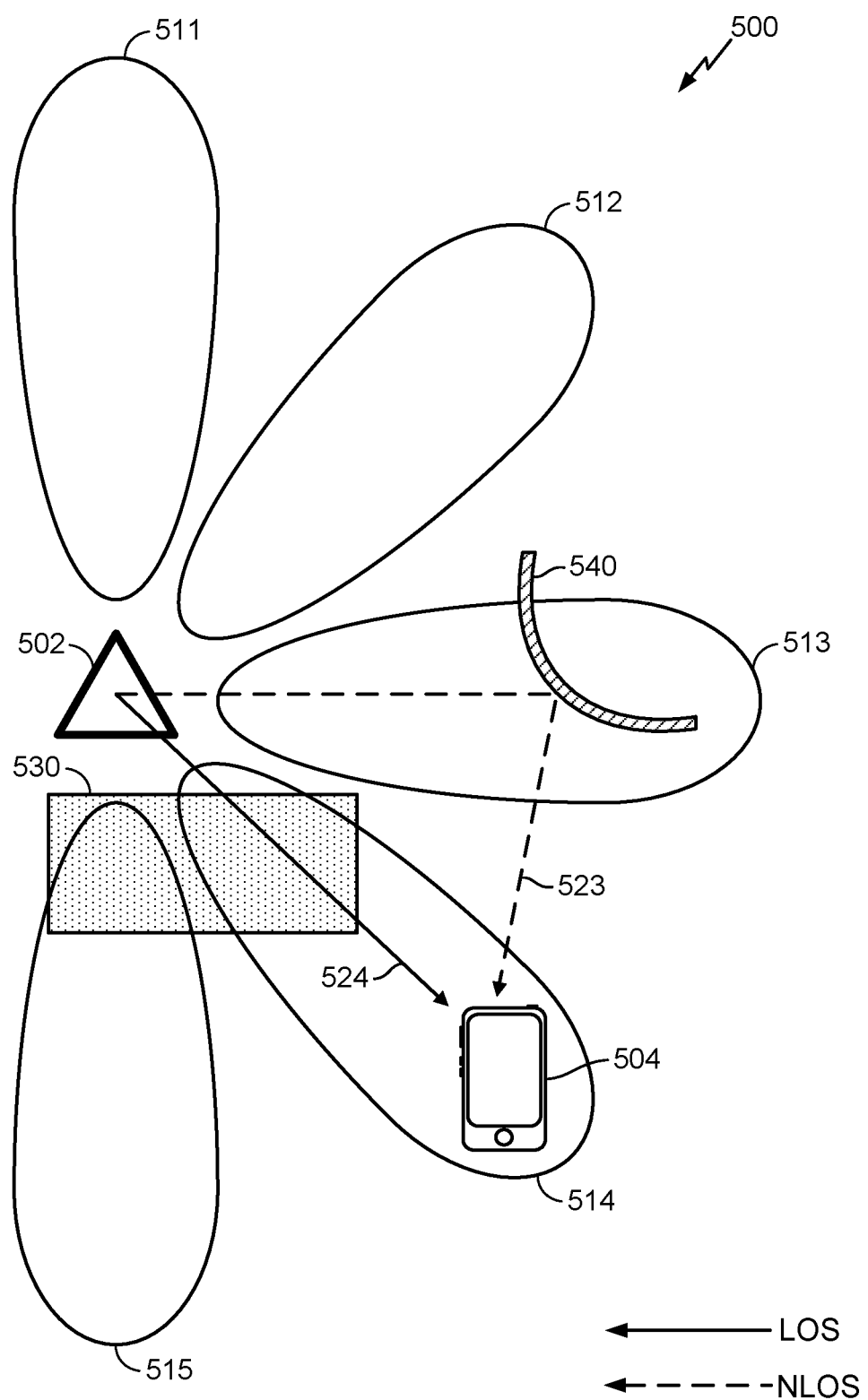
FIG. 5 illustrates an exemplary wireless communications system according to various aspects.

FIG. 5 illustrates an exemplary wireless communications system 500 according to various aspects of the disclosure. In the example of FIG. 5, a UE 504, which may correspond to UE 404 in FIG. 4, is attempting to calculate an estimate of its position, or to assist another entity (e.g., a base station or core network component, another UE, a location server, a third party application, etc.) to calculate an estimate of its position. The UE 504 may communicate wirelessly with a base station 502, which may correspond to one of base stations 402 in FIG. 4, using RF signals and standardized protocols for the modulation of the RF signals and the exchange of information packets.

As illustrated in FIG. 5, the base station 502 is utilizing beamforming to transmit a plurality of beams 511-515 of RF signals. Each beam 511-515 may be formed and transmitted by an array of antennas of the base station 502. Although FIG. 5 illustrates a base station 502 transmitting five beams, as will be appreciated, there may be more or fewer than five beams, beam shapes such as peak gain, width, and side-lobe gains may differ amongst the transmitted beams, and some of the beams may be transmitted by a different base station.

A beam index may be assigned to each of the plurality of beams 511-515 for purposes of distinguishing RF signals associated with one beam from RF signals associated with another beam. Moreover, the RF signals associated with a particular beam of the plurality of beams 511-515 may carry a beam index indicator. A beam index may also be derived from the time of transmission, e.g., frame, slot and/or OFDM symbol number, of the RF signal. The beam index indicator may be, for example, a three-bit field for uniquely distinguishing up to eight beams. If two different RF signals having different beam indices are received, this would indicate that the RF signals were transmitted using different beams. If two different RF signals share a common beam index, this would indicate that the different RF signals are transmitted using the same beam. Another way to describe that two RF signals are transmitted using the same beam is to say that the antenna port(s) used for the transmission of the first RF signal are spatially quasi-collocated with the antenna port(s) used for the transmission of the second RF signal.

In the example of FIG. 5, the UE 504 receives an NLOS stream 523 of RF signals transmitted on beam 513 and an LOS stream 524 of RF signals transmitted on beam 514. Although FIG. 5 illustrates the NLOS stream 523 and the LOS stream 524 as single lines (dashed and solid, respectively), as will be appreciated, the NLOS stream 523 and the LOS stream 524 may each comprise multiple rays (i.e., a "cluster") by the time they reach the UE 504 due, for example, to the propagation characteristics of RF signals through multipath channels. For example, a cluster of RF signals is formed when an electromagnetic wave is reflected off of multiple surfaces of an object, and reflections arrive at the receiver (e.g., UE 504) from roughly the same angle, each travelling a few wavelengths (e.g., centimeters) more or less than others. A "cluster" of received RF signals generally corresponds to a single transmitted RF signal.

In the example of FIG. 5, the NLOS stream 523 is not originally directed at the UE 504, although, as will be appreciated, it could be, as are the RF signals on the NLOS paths 412 in FIG. 4. However, it is reflected off a reflector 540 (e.g., a building) and reaches the UE 504 without obstruction, and therefore, may still be a relatively strong RF signal. In contrast, the LOS stream 524 is directed at the UE 504 but passes through an obstruction 530 (e.g., vegetation, a building, a hill, a disruptive environment such as clouds or smoke, etc.), which may significantly degrade the RF signal. As will be appreciated, although the LOS stream 524 is weaker than the NLOS stream 523, the LOS stream 524 will arrive at the UE 504 before the NLOS stream 523 because it follows a shorter path from the base station 502 to the UE 504.

As noted above, the beam of interest for data communication between a base station (e.g., base station 502) and a UE (e.g., UE 504) is the beam carrying RF signals that arrives at the UE with the highest signal strength (e.g., highest RSRP or SINR), whereas the beam of interest for position estimation is the beam carrying RF signals that excite the LOS path and that has the highest gain along the LOS path amongst all other beams (e.g., beam 514). That is, even if beam 513 (the NLOS beam) were to weakly excite the LOS path (due to the propagation characteristics of RF signals, even though not being focused along the LOS path), that weak signal, if any, of the LOS path of beam 513 may not be as reliably detectable (compared to that from beam 514), thus leading to greater error in performing a positioning measurement.

While the beam of interest for data communication and the beam of interest for position estimation may be the same beams for some frequency bands, for other frequency bands, such as mmW, they may not be the same beams. As such, referring to FIG. 5, where the UE 504 is engaged in a data communication session with the base station 502 (e.g., where the base station 502 is the serving base station for the UE 504) and not simply attempting to measure reference RF signals transmitted by the base station 502, the beam of interest for the data communication session may be the beam 513, as it is carrying the unobstructed NLOS stream 523. The beam of interest for position estimation, however, would be the beam 514, as it carries the strongest LOS stream 524, despite being obstructed.

Figure 6A:
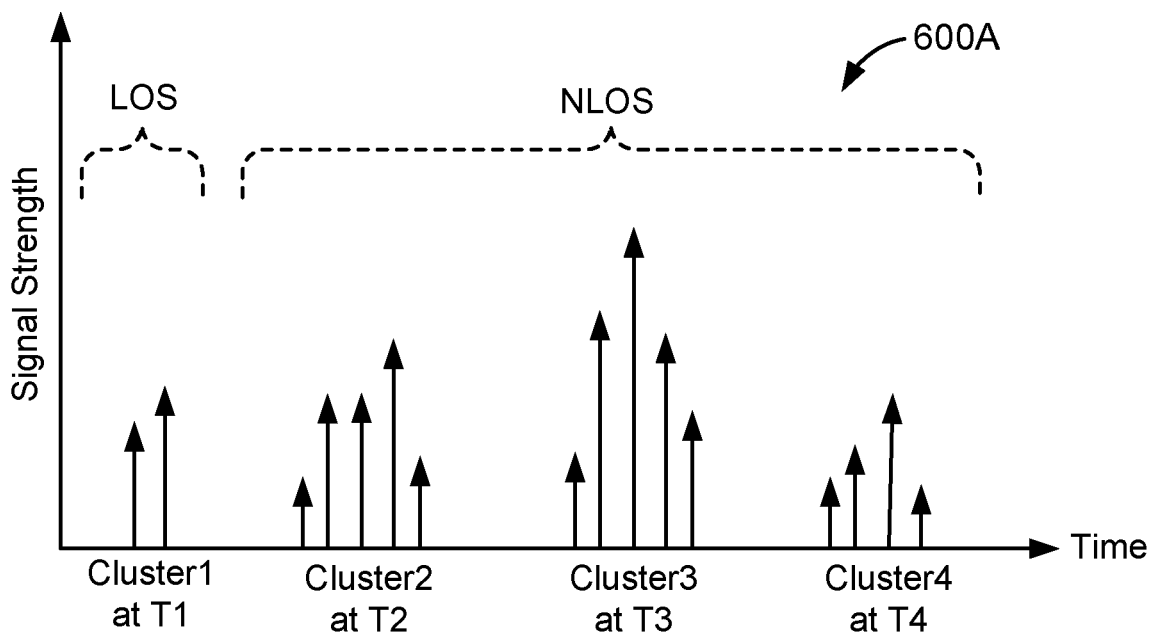
FIG. 6A is a graph showing the RF channel response at a UE over time according to various aspects.
Figure 6B:
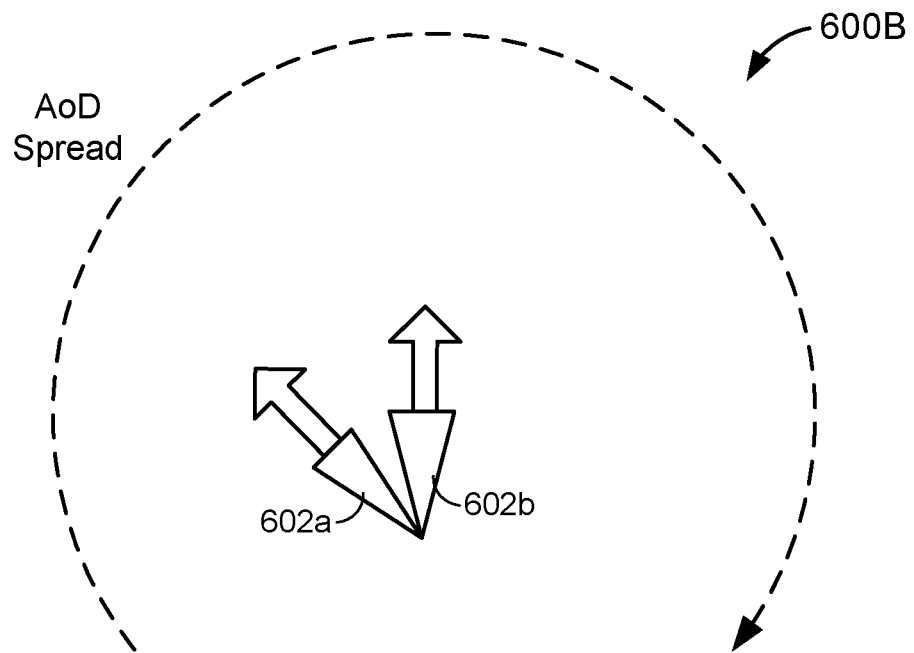
FIG. 6B illustrates an exemplary separation of clusters in angle of departure (AoD) according to various aspects.

FIG. 6A is a graph 600A showing the RF channel response at a receiver (e.g., UE 504) over time according to aspects of the disclosure. Under the channel illustrated in FIG. 6A, the receiver receives a first cluster of two RF signals on channel taps at time T1, a second cluster of five RF signals on channel taps at time T2, a third cluster of five RF signals on channel taps at time T3, and a fourth cluster of four RF signals on channel taps at time T4. In the example of FIG. 6A, because the first cluster of RF signals at time T1 arrives first, it is presumed to be the LOS stream (i.e., the stream arriving over the LOS or the shortest path), and may correspond to the LOS stream 524. The third cluster at time T3 is comprised of the strongest RF signals, and may correspond to the NLOS stream 523. Seen from the transmitter's side, each cluster of received RF signals may comprise the portion of an RF signal transmitted at a different angle, and thus each cluster may be said to have a different angle of departure (AoD) from the transmitter. FIG. 6B is a diagram 600B illustrating this separation of clusters in AoD. The RF signal transmitted in AoD range 602a may correspond to one cluster (e.g., "Cluster1") in FIG. 6A, and the RF signal transmitted in AoD range 602b may correspond to a different cluster (e.g., "Cluster3") in FIG. 6A. Note that although AoD ranges of the two clusters depicted in FIG. 6B are spatially isolated, AoD ranges of some clusters may also partially overlap even though the clusters are separated in time. For example, this may arise when two separate buildings at same AoD from the transmitter reflect the signal towards the receiver. Note that although FIG. 6A illustrates clusters of two to five channel taps, as will be appreciated, the clusters may have more or fewer than the illustrated number of channel taps.

As in the example of FIG. 5, the base station may utilize beamforming to transmit a plurality of beams of RF signals such that one of the beams (e.g., beam 514) is directed at the AoD range 602a of the first cluster of RF signals, and a different beam (e.g., beam 513) is directed at the AoD range 602b of the third cluster of RF signals. The signal strength of clusters in post-beamforming channel response (i.e., the channel response when the transmitted RF signal is beamformed instead of omni-directional) will be scaled by the beam gain along the AoD of the clusters. In that case, the beam of interest for positioning would be the beam directed at the AoD of the first cluster of RF signals, as they arrive first, and the beam of interest for data communications may be the beam directed at the AoD of the third cluster of RF signals, as they are the strongest.

In general, when transmitting an RF signal, the transmitter does not know what path it will follow to the receiver (e.g., UE 504) or at what time it will arrive at the receiver, and therefore transmits the RF signal on different antenna ports with an equal amount of energy. Alternatively, the transmitter may beamform the RF signal in different directions over multiple transmission occasions and obtain measurement feedback from the receiver to explicitly or implicitly determine radio paths.

Note that although the techniques disclosed herein have generally been described in terms of transmissions from a base station to a UE, as will be appreciated, they are equally applicable to transmissions from a UE to a base station where the UE is capable of MIMO operation and/or beamforming. Also, while beamforming is generally described above in context with transmit beamforming, receive beamforming may also be used in conjunction with the above-noted transmit beamforming in certain embodiments.

As discussed above, in some frequency bands, the shortest path (which may, as noted above, be a LOS path or the shortest NLOS path) may be weaker than an alternative longer (NLOS) path (over which the RF signal arrives later due to propagation delay). Thus, where a transmitter uses beamforming to transmit RF signals, the beam of interest for data communication—the beam carrying the strongest RF signals—may be different from the beam of interest for position estimation—the beam carrying the RF signals that excite the shortest detectable path. As such, it would be beneficial for the receiver to identify and report the beam of interest for position estimation to the transmitter to enable the transmitter to subsequently modify the set of transmitted beams to assist the receiver to perform a position estimation.

Thus far, OTDOA based position estimating techniques have been discussed. But when the transmitter antennas are collocated—i.e., the distance between the antennas is comparable to the carrier wavelength (e.g., within 10 wavelengths or less), the OTDOA based triangulation/multilateration can become impractical, e.g., because time difference of arrival from collocated transmission points can be too small to accurately measure by the receiver. However, the collocated antennas ports can still be used for AoD estimation, and thus positioning, through observed phase difference of arrival (OPDoA) measurements. But for the AoD estimation to take place, the transmitter antennas should be coherent, which is not always the case, especially at mmW carrier frequencies. As a result, the receiver (e.g., the UE) should be notified as to which antenna ports of the transmitter can be treated as coherent.

Figure 7A:
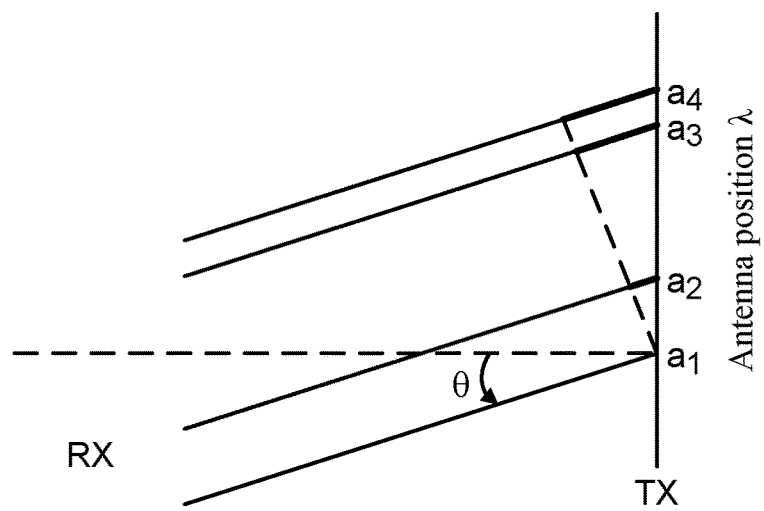
FIG. 7A illustrates an example arrangement of collocated transmission ports for estimating AoD according to various aspects.

FIG. 7A illustrates an example arrangement for estimating AoD from OPDoA measurements when a transmitter (TX) transmits a plurality of signals to a receiver (RX). The TX may be provisioned with a plurality of antennas (e.g., four antennas) to transmit the signals. The antennas may also be referred to as "transmission ports" (TPs). In FIG. 7A, the TX (e.g., a base station) is assumed to be provisioned with four transmission points transmitting signals to the RX located at an angle θ, which is the AoD, from the transmission points. The following are assumed:

The transmission points are collocated (the transmission points are separated by a few wavelengths λ at most);

The transmitted signals are coherent (same frequency, fixed phase relationships); and The transmitted signals are all distinguishable from each other (in time, frequency, and/or code domains).

In FIG. 7A, it is assumed that the four transmission points are located at positions $a_1$, $a_2$, $a_3$ and $a_4$. Since the transmission points are collocated, this means that the separation among the positions (e.g., between $a_1$ and $a_2$) is at most few wavelengths λ of the carrier. Indeed, the separation may even be less than a single λ. Due to the physical separation of the transmission points, the distances traveled by the signals transmitted from the different transmission points to the RX will be different, which will manifest at the RX as changes in phases relative to one another. In other words, the received phase relationships will be different from the transmitted phase relationships. Then by observing the PDoAs of the signals at the receiver RX, the AoD θ may be estimated.

The process may be generally described as follows: First, let $d_{ij} \equiv a_i - a_j$ (in units of wavelength λ), and $\omega = 2\pi \sin\theta$. Then assuming coherent transmission points, the PDoA $\Delta_{ij}$ between signals from transmission points $a_i - a_j$ may be expressed as $\Delta_{ij} = e^{j\omega d_{ij}}$. The RX may measure the phase difference $\Delta_{ij}$ between the signals received from transmission points (e.g., antenna ports) i and j.

Figure 7B:
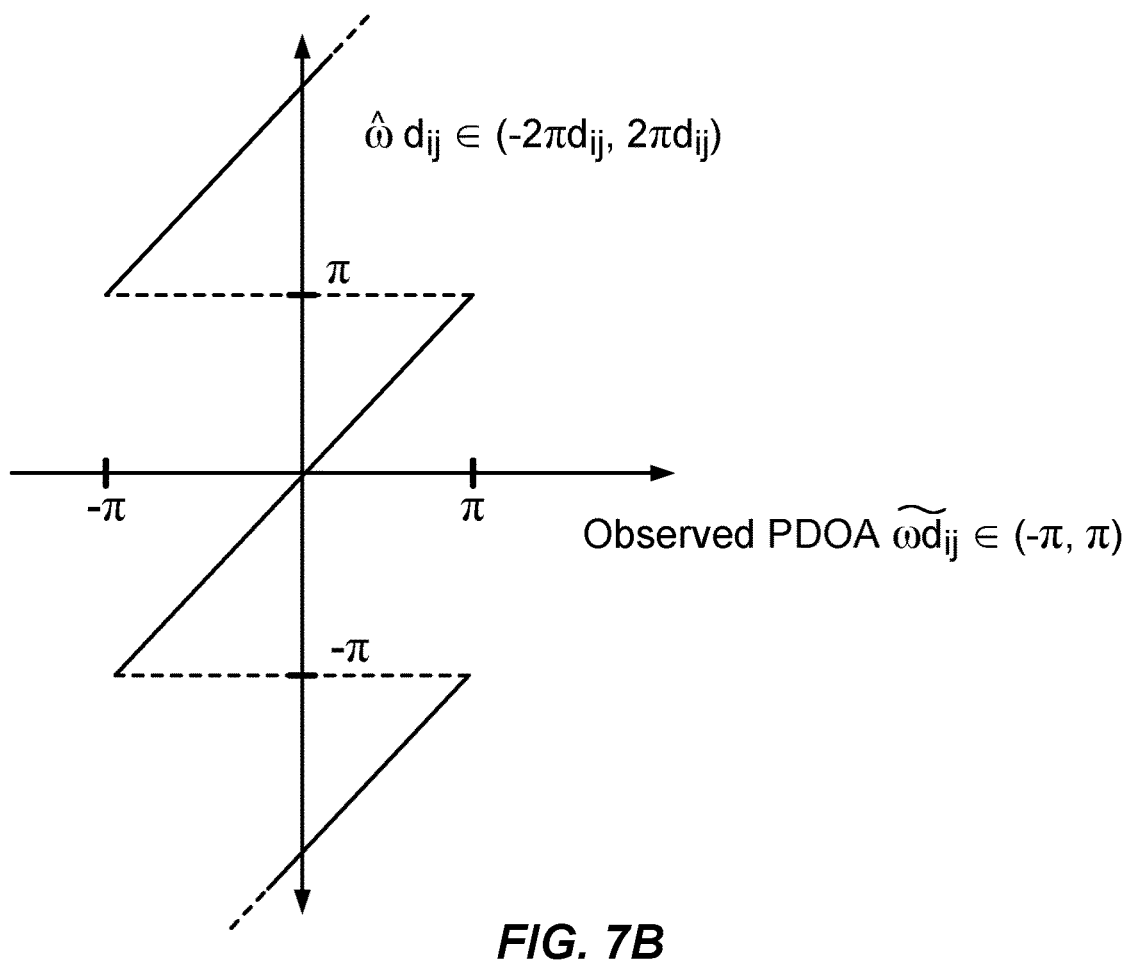
FIG. 7B illustrates a graphical relationship between observed phased difference of arrival (OPDoA) measurements from which the AoD may be derived according to various aspects.

FIG. 7B illustrates a graphical relationship between OPDoAs from which the AoD may be derived. Note that there can be multiple AoD solutions ω when $d_{ij} \geq \frac{1}{2}$. To arrive at a unique AoD solution, three or more transmission points may be specified from which the PDoA measurements may take place. Moreover, the transmission points may be placed non-uniformly for redundancy, e.g., $d_{ij} \neq d_{kl}$, for all $(i,j) \neq (k,l)$ or at least for some $(i,j) \neq (k,l)$. The former is analogous to a Costas Array, which may be described as a distribution of points in a grid in which each row or column of the grid contains only one point, and that all of the displacement vectors between each pair of points are distinct. With the transmission points distributed as such, redundancy can be provided so that unique AoD solution may be arrived at through the PDoA measurements.

FIGS. 8-12 illustrate exemplary methods according to various aspects of the disclosure. It should be noted that not all illustrated blocks of FIGS. 8-12 need be performed, i.e., some blocks may be optional. Also, the numerical references to the blocks in FIGS. 8-12 should not be taken as requiring that the blocks should be performed in a certain order. Indeed, some blocks may be performed concurrently.

Figure 8:
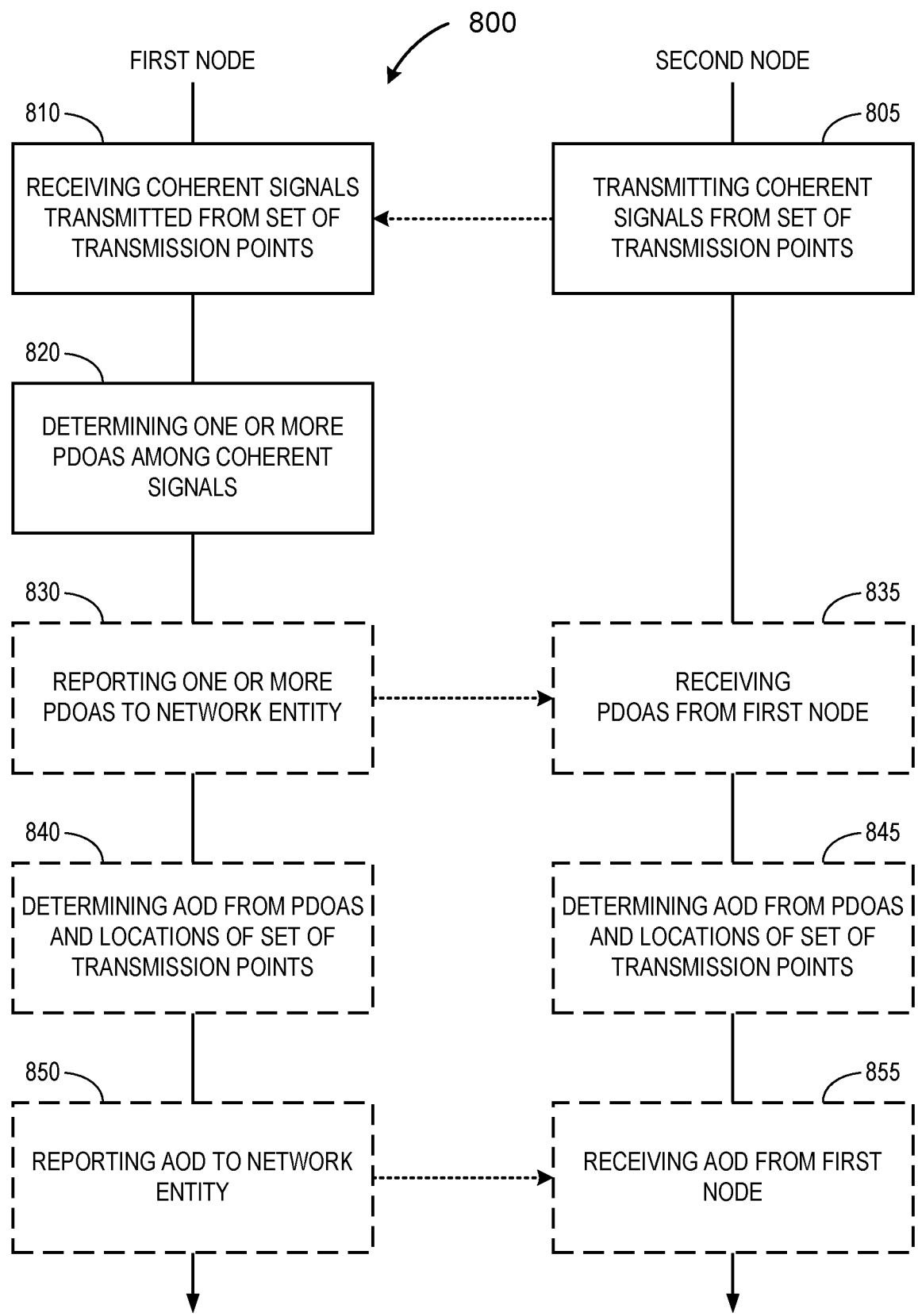
FIGS. 8-12 illustrate exemplary methods according to various aspects.

FIG. 8 illustrates an exemplary method 800 according to an aspect of the disclosure for determining AoD. The method 800 involves first and second nodes (respectively referred to as the "receiver" and the "transmitter"). In an aspect, the first and second nodes are respectively a UE and a base station of a network. In another aspect, the first and second nodes are respectively a base station and a UE. That is, both the UE and the base station can play the roles of the transmitter and the receiver. At 805, the second node transmits signals from a set of transmission points. If the second node is the base station, the set of transmission points are associated with the base station. If the second node is the UE, the set of transmission points are associated with the UE.

In an aspect, the set of transmission points are collocated and are configured to transmit coherent signals. The signals transmitted by the transmission points can be reference RF signals (e.g., pilot, PRS, CRS, CSI-RS), synchronization signals (e.g., SS, PBCH blocks), random access preamble, and so on. Also, the signals transmitted from the set of transmission points are all distinguishable from each other in one or more of the time, frequency, and code domains.

At 810, the first node receives the coherent signals transmitted from at least two transmission points of the set of transmission points of the second node. At 820, the first node measures or otherwise determines the PDoAs of the received coherent signals. In one aspect, at 830, the first node reports the PDoAs to a network entity, e.g., base station, location server, etc. For example, the first node may be the UE reporting the PDoAs back to the second node (e.g., base station). In this aspect, at 835, the second node receives the PDoAs from the UE. Then at 845, the second node or some other network entity (e.g., location server) estimates or otherwise determines the AoD of the transmitted signals from the reported PDoAs.

It should be noted that to determine the AoD, the locations of the set of transmission nodes should also be known. Presumably, the network entity has this knowledge. When the PDoAs are received from the UE, the network entity can calculate the AoD based on the received PDoAs and the locations of the set of transmission locations.

Alternatively or in addition thereto, at 840, the first node estimates or otherwise determines the AoD from the determined PDoAs. For example, when the UE is the first node, the UE determines the AoD of the signals transmitted from the transmission points of the second node. In another example, when the base station is the first node, a network entity (e.g., the base station, the location server) determines the AoD of the signals transmitted from the transmission points of the UE. At 850, the first node can report the AoD, and at 855, the second node can receive the AoD report.

The above discussion demonstrates that the UE can measure the PDoA between signals.

However, it is often the case that the UE does not know which transmission point signals to measure in order to determine the PDoAs. In an aspect of the disclosure, it is proposed that a network entity, such as a location server or a base station, provide the UE with a list or a set of transmission points that transmit the coherent signals. With this knowledge, the UE can measure the signals transmitted from the set of transmission points and determine their PDoAs. As seen in FIG. 8, the UE may estimate the AoD of the signals based on the measured PDoAs. Alternatively or in addition thereto, the UE may report the measured PDoAs back to the network, and the network entity may estimate the AoD.

Figure 9:
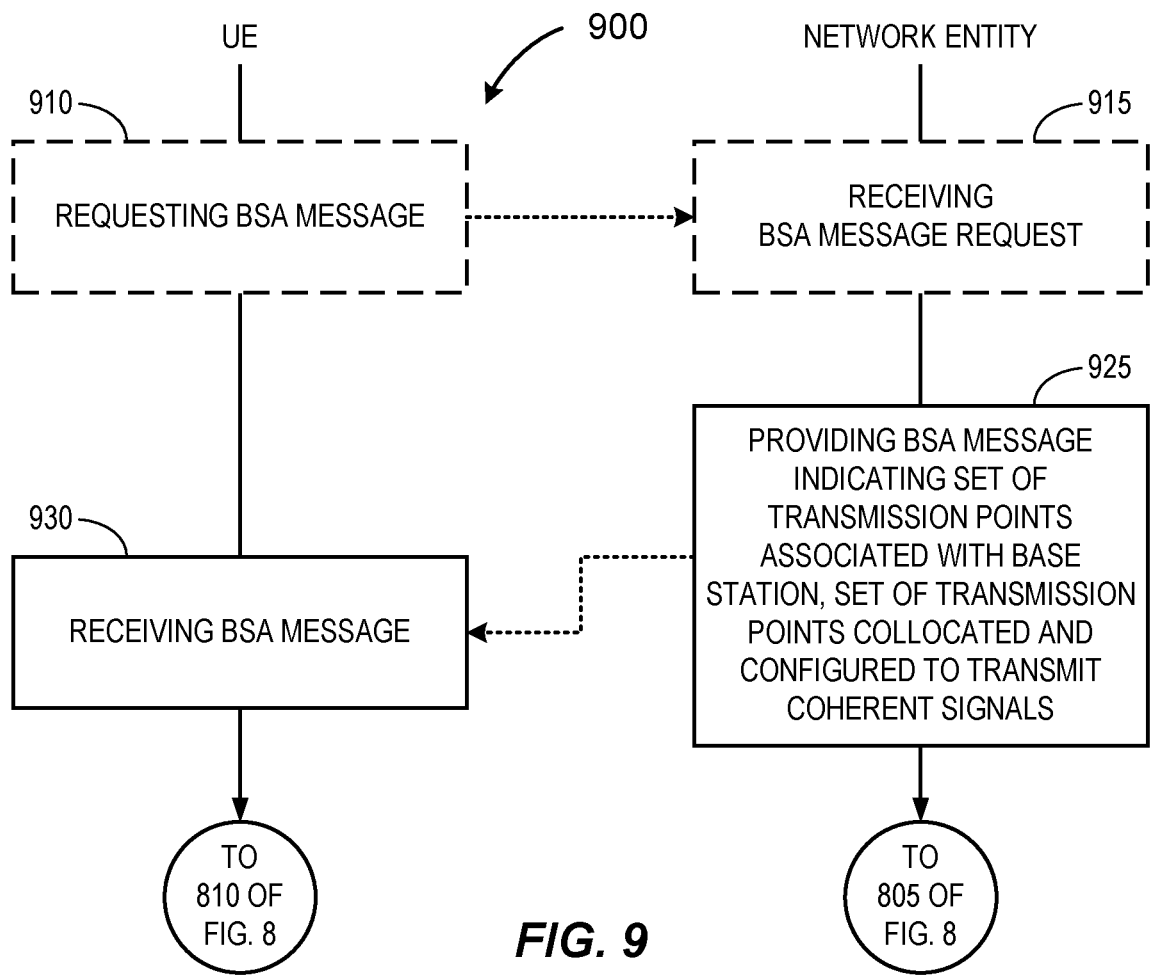

FIG. 9 illustrates an exemplary method 900 for providing the base station almanac (BSA) information to a UE. The method 900 involves the UE and a network entity (e.g., base station, location server, and the like) that has knowledge regarding the set of transmission points. At 910, the UE makes a request to the network entity for a BSA message. At 915, the network entity receives the BSA message request. At 925, the network entity transmits the BSA message. The network entity can then proceed to 805 of FIG. 8. At 930, the UE receives the BSA message. The UE can then proceed to 810 of FIG. 8. FIG. 9 demonstrates that the UE may initiate by requesting the BSA information at 910. Alternatively, the network entity may initiate by providing the BSA information to the UE at 925.

In an aspect the BSA message indicates a set of transmission points associated with a base station. The BSA message can be one message or a plurality of messages. The set of transmission points are collocated. That is, the separation between the transmission points is comparable to the wavelength λ of the carrier signals transmitted from the set of transmission points. For example, the transmission points may be separated by no more than ten wavelengths. Some may be separated by even less than a single wavelength λ.

The set of transmission points transmit signals that are all distinguishable from each other. That is, the signals are orthogonal (or nearly orthogonal) to each other in any one or more domains of time, frequency, and code. To state it another way, between any two transmission points in the set of transmission points, signals transmitted from the two transmission points are distinguishable from each other in a time domain, a frequency domain, a code domain, or any combination thereof.

The signals transmitted by the set of transmission points are also coherent, i.e., the signals are all transmitted at the same frequency and with known or determined phase relationships. An example of known or determined phase relationship is a fixed phase relationship, and an example of a fixed phase relationship is a zero phase relationship—i.e., the phases of all signals are aligned at transmission. In another example, the phase relationship between adjacent transmission points may be offset by a fixed amount, e.g., 30 degrees.

The BSA message from the network entity indicates the set of transmission points of a base station that transmit the coherent signals. With this knowledge, the UE can measure the transmitted signals and determine the PDoAs among the signals received from the set of transmission points since the signals are all distinguishable from each other (e.g., see 810 and 820 of FIG. 8).

The BSA message may also indicate the phase relationships among the transmitted signals. For example, a fixed phase relationships among the transmitted signals may be indicated. If the phase relationships are indicated in the BSA message, the UE can compensate in determining the true PDoAs. For example, if the UE measures the PDoA between first and second signals (respectively transmitted from first and second transmission points) as 45 degrees, but the BSA message indicates that the first and second signals are transmitted with 30 degrees offset, the UE can then determine that the actual PDoA is 15 degrees. If the phase relationships are not indicated in the BSA message, the UE can assume a zero fixed phased relationship.

The UE itself can determine the AoD of the signals from the PDoAs. To enable the AoD determination, the BSA message also indicates the locations of the set of transmission points. Based on the measured PDoAs and the indicated locations of the set of transmission points, the UE can determine the AoD (e.g., see 840 of FIG. 8). The UE can report the AoD back to the network entity (e.g., see 850 and 855 of FIG. 8).

If the BSA message does not indicate the locations of the set of transmission points and/or the network entity requests the PDoA measurements, the UE can report back to the network entity the PDoAs (e.g., see 830 of FIG. 8). Presumably, the network entity has knowledge of the locations of the set of transmission points. With this knowledge and based on the reported PDoAs, the network entity can determine the AoD (e.g., see 835 and 845 of FIG. 8).

The accuracy of the calculated AoD increases when the locations of the set of transmission points are known more precisely. In an embodiment, the BSA message indicates the locations of the set of transmission points to precisions better than a wavelength of the coherent signals. Optionally, position uncertainty of the transmission points can be included in the BSA message. This can allow the UE or any positioning entity to determine whether the locations of the transmission points are known to desired precision. In another embodiment, the BSA message may include, in addition to the locations of the set of transmission points, information regarding the precision of the locations. For example, the BSA message may include a flag to indicate that the "precision is better than a wavelength of the coherent signals."

Preferably, the BSA message indicates the locations of the set of transmission points in at least two dimensions. If the locations are indicated in two dimensions, then the azimuth of the AoD can be calculated. If the locations are indicated in three dimensions, then the azimuth and the altitude of the AoD can be calculated.

Recall from above that between any two transmission points, there can be multiple AoD solutions $\hat{\omega}$ when the separation between them is more than half of a wavelength, i.e., when $d_{ij}=a_i-a_j \geq \frac{1}{2}\lambda$. To address this issue and arrive at a unique AoD solution, the set of transmission points can include three or more transmission points. Also, the distribution of the set of transmission points is preferably non-uniform. That is, the locations of the set of transmission points are such that the separations among the set of transmission points are non-uniform. This can provide redundancy so that there is a better possibility of calculating a unique AoD.

The network entity can choose the set of transmission points from a super set of transmission points. In this way, even if the transmission points within the super set are uniformly distributed, the set can be chosen such that transmission points within the chosen set are non-uniformly distributed.

The set of transmission points may be chosen such that the coherent signals transmitted from the set of transmission points are all signals of a same beam. This can be useful when a general location of the UE is known. If the general location is within a path of a beam, then the set of transmission points can be chosen accordingly. In this way, a more precise AoD determination can be made.

On the other hand, if the UE is not in a path of a beam, the UE may not be able to detect one or more signals of that beam. Thus, if it is not known whether the UE is in a path of any beam, then the transmission points that transmit broader (less focused) signals may be chosen for the set of transmission points. To state it another way, at least one coherent signal transmitted from the set of transmission points does not form a beam with at least one other coherent signal.

Figure 10:
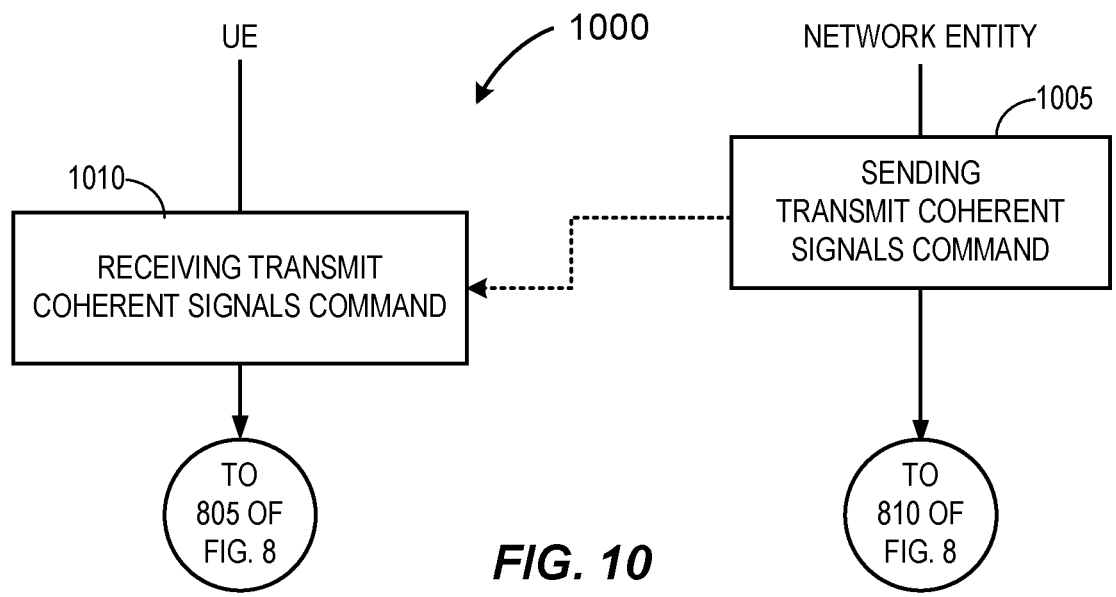

In FIG. 9, the UE is the receiver or the first node and the network entity (e.g., the base station, the location server) is the transmitter. However, those roles can be reversed as seen in FIG. 10, which illustrates an exemplary method 1000 for causing the UE to transmit the coherent signals. At 1005, the network entity sends a command to the UE to transmit coherent signals. The network entity can then proceed to 810 of FIG. 8. At 1010, the UE receives the command from the network entity. The UE can then proceed to 805 of FIG. 8 in response to the command. The AoD of the signals can be determined.

Figure 11:
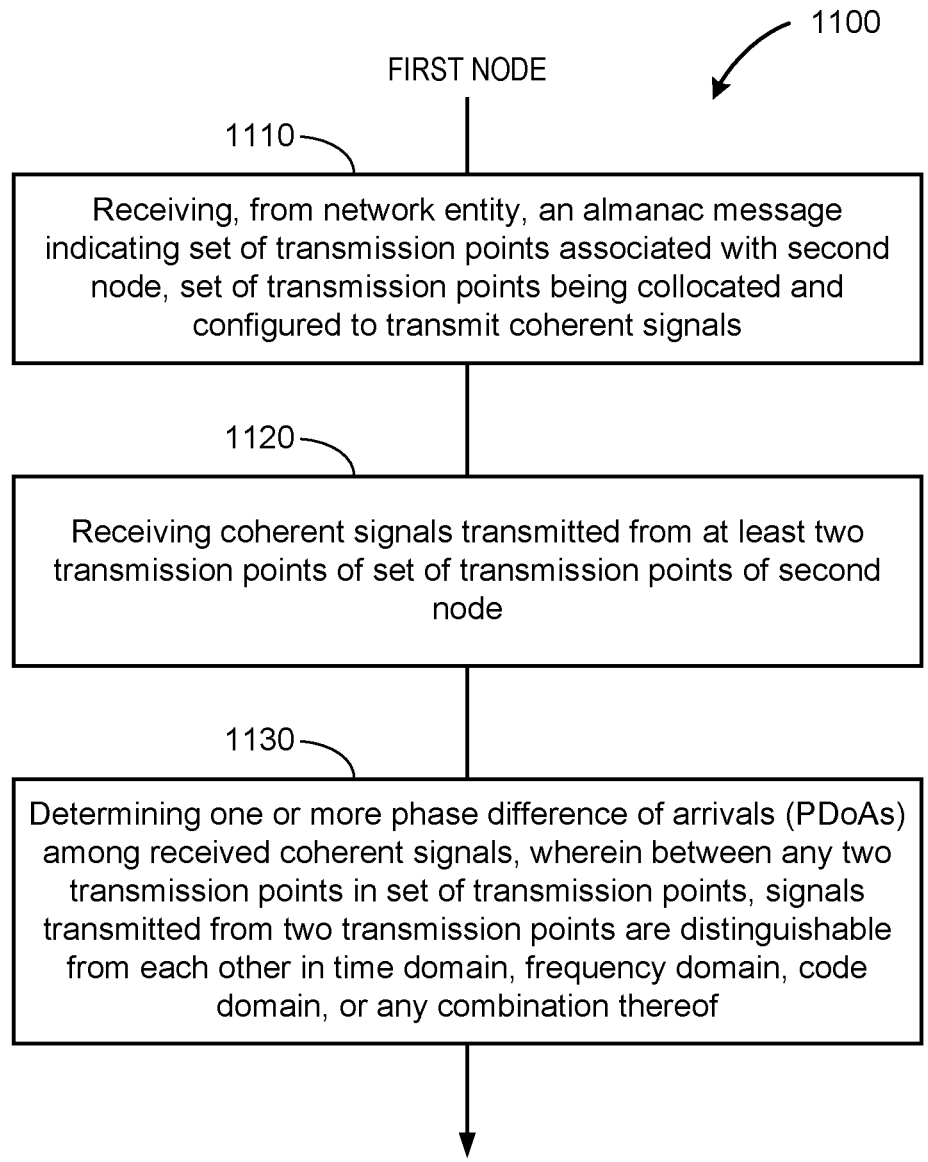

FIG. 11 illustrates a method 1100 performed by a first node generally. In block 1110, the first node may receive an almanac message from a network entity (e.g., base station, location server, etc.). In an aspect, if the first node is the UE, then means to perform block 1110 may include the controller/processor 339 and/or the RX processor 356 of the UE 350 illustrated in FIG. 3. If the first node is the base station, then means to perform block 810 may include the controller/processor 375 and/or the RX processor 370 of the base station 310 illustrated in FIG. 3. The almanac message may indicate a set of transmission points associated with a second node (e.g., base station, UE). The set of transmission points may be collocated and configured to transmit coherent signals. BSA may be an example of the almanac message.

In block 1120, the first node may receive the coherent signals transmitted from at least two transmission points of the set of transmission points of the second node. In an aspect, if the first node is the UE, then means to perform block 1120 may include the controller/processor 339 and/or the RX processor 356 of the UE 350 illustrated in FIG. 3. If the first node is the base station, then means to perform block 1120 may include the controller/processor 375 and/or the RX processor 370 of the base station 310 illustrated in FIG. 3.

In block 1130, the first node may determine one or more phase difference of arrivals (PDoAs) among the received coherent signals. In an aspect, if the first node is the UE, then means to perform block 1120 may include the controller/processor 339 of the UE 350 illustrated in FIG. 3. If the first node is the base station, then means to perform block 1120 may include the controller/processor 375 of the base station 310 illustrated in FIG. 3. Between any two transmission points in the set of transmission points, signals transmitted from the two transmission points may be distinguishable from each other in a time domain, a frequency domain, a code domain, or any combination thereof.

Figure 12:
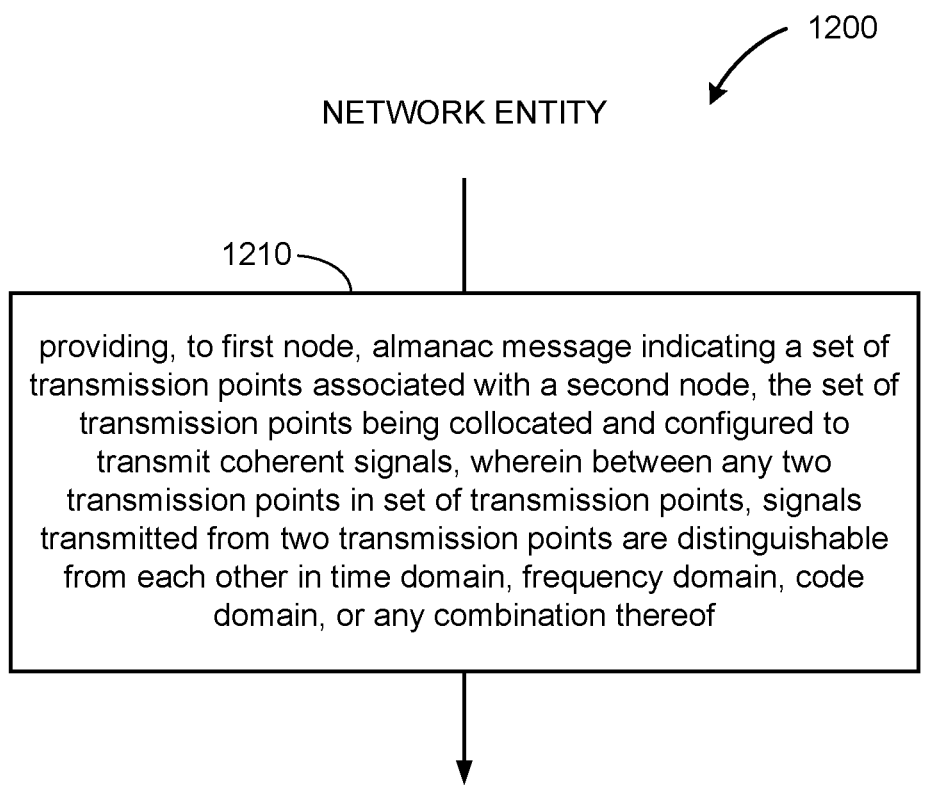

FIG. 12 illustrates a method 1200 performed by a network entity (e.g., location server, base station) generally. In block 1210, the network node may provide an almanac message to a first node (e.g., UE, base station). In an aspect, if the network entity is the location server, then means to perform block 1210 may include the processor 301B and/or the network access ports 304B, which may also be referred to as communication interface. If the network entity is the base station, then means to perform block 1210 may include the controller/processor 375 and/or the TX processor 316 of the base station 310 illustrated in FIG. 3. It should be noted that the any combination of the TX processor 316, the RX processor 370, the transmitter 318a, and the receiver 318b may be referred to as communication interface.

The almanac message may indicate a set of transmission points associated with a second node (e.g., base station, UE). The set of transmission points may be collocated and configured to transmit coherent signals. BSA may be an example of the almanac message. Also, between any two transmission points in the set of transmission points, signals transmitted from the two transmission points may be distinguishable from each other in a time domain, a frequency domain, a code domain, or any combination thereof.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the various aspects described herein.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or other such configurations).

The methods, sequences, and/or algorithms described in connection with the aspects disclosed herein may be embodied directly in hardware, in a software module executed by a processor, or in a combination of the two. A software module may reside in Random Access Memory (RAM), flash memory, Read-Only Memory (ROM), Erasable Programmable ROM (EPROM), Electrically Erasable Programmable ROM (EEPROM), registers, hard disk, a removable disk, a CD-ROM, or any other form of non-transitory computer-readable medium known in the art. An exemplary non-transitory computer-readable medium may be coupled to the processor such that the processor can read information from, and write information to, the non-transitory computer-readable medium. In the alternative, the non-transitory computer-readable medium may be integral to the processor. The processor and the non-transitory computer-readable medium may reside in an ASIC. The ASIC may reside in a user device (e.g., a UE) or a base station. In the alternative, the processor and the non-transitory computer-readable medium may be discrete components in a user device or base station.

In one or more exemplary aspects, the functions described herein may be implemented in hardware, software, firmware, or any combination thereof. If implemented in software, the functions may be stored on or transmitted over as one or more instructions or code on a non-transitory computer-readable medium. Computer-readable media may include storage media and/or communication media including any non-transitory medium that may facilitate transferring a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of a medium. The term disk and disc, which may be used interchangeably herein, includes a Compact Disk (CD), laser disc, optical disk, Digital Video Disk (DVD), floppy disk, and Blu-ray discs, which usually reproduce data magnetically and/or optically with lasers. Combinations of the above should also be included within the scope of computer-readable media.

While the foregoing disclosure shows illustrative aspects, those skilled in the art will appreciate that various changes and modifications could be made herein without departing from the scope of the disclosure as defined by the appended claims. Furthermore, in accordance with the various illustrative aspects described herein, those skilled in the art will appreciate that the functions, steps, and/or actions in any methods described above and/or recited in any method claims appended hereto need not be performed in any particular order. Further still, to the extent that any elements are described above or recited in the appended claims in a singular form, those skilled in the art will appreciate that singular form(s) contemplate the plural as well unless limitation to the singular form(s) is explicitly stated.

What is claimed is:

1. A first node, comprising:
a memory;
a receiver; and
a processor coupled to the memory and the transceiver,
wherein the processor is configured to:
  receive, from a network entity through the receiver, an almanac message identifying a set of transmission points associated with a second node as being collocated and configured to transmit coherent signals,
  receive, through the receiver, the coherent signals transmitted from at least two transmission points of the set of transmission points of the second node, and
  determine one or more phase difference of arrivals (PDoAs) among the coherent signals,
wherein between any two transmission points in the set of transmission points, signals transmitted from the two transmission points are distinguishable from each other in a time domain, a frequency domain, a code domain, or any combination thereof.

2. The first node of claim 1,
wherein the almanac message also indicates locations of the set of transmission points, and
wherein the processor is further configured to determine an angle of departure (AoD) of the received coherent signals based on the one or more PDoAs and the locations of the set of transmission points.

3. The first node of claim 2,
wherein the almanac message indicates the locations of the set of transmission points, and
wherein the locations' precision is better than a wavelength of the coherent signals.

4. The first node of claim 2, wherein the locations of the set of transmission points indicated in the almanac message are in at least two dimensions.

5. The first node of claim 2, wherein the almanac message indicates that the locations of the set of transmission points are such that the set of transmission points are non-uniformly distributed.

6. The first node of claim 1, wherein the coherent signals are all signals of a same beam.

7. The first node of claim 1, wherein at least one coherent signal does not form a beam with at least one other coherent signal.

8. The first node of claim 1, further comprising a transmitter, wherein the processor is further configured to report, through the transmitter, the one or more PDoAs to the network entity.

9. A network entity, comprising:
a memory;
a communication interface; and
a processor coupled to the memory and the communication interface,
wherein the processor is configured to provide, to a first node through the communication interface, an almanac message indicating a set of transmission points associated with a second node as being collocated and configured to transmit coherent signals, and
wherein between any two transmission points in the set of transmission points, signals transmitted from the two transmission points are distinguishable from each other in a time domain, a frequency domain, a code domain or any combination thereof.

10. The network entity of claim 9,
wherein the almanac message also indicates locations of the set of transmission points,
wherein the processor is further configured to receive, from the first node through the communication interface, an angle of departure (AoD) of two or more of the coherent signals received at the first node, and
wherein the first node determines the AoD of the received coherent signals based on one or more phase difference of arrivals (PDoAs) and the locations of the set of transmission points.

11. The network entity of claim 10,
wherein the almanac message indicates the locations of the set of transmission points, and
wherein the locations' precision is better than a wavelength of the coherent signals.

12. The network entity of claim 10, wherein the locations of the set of transmission points indicated in the almanac message are in at least two dimensions.

13. The network entity of claim 10, wherein the almanac message indicates that the locations of the set of transmission points are such that the set of transmission points are non-uniformly distributed.

14. The network entity of claim 9, wherein the coherent signals are all signals of a same beam.

15. The network entity of claim 9, wherein at least one coherent signal does not form a beam with at least one other coherent signal.

16. The network entity of claim 9, wherein the processor is further configured to:
receive, from the first node through the communication interface, one or more phase difference of arrivals (PDoAs) among the coherent signals determined by the first node; and
determine an angle of departure (AoD) of the coherent signals from the set of transmission points based on the one or more PDoAs and the locations of the set of transmission points.

17. A method of operating a first node, comprising:
receiving, from a network entity, an almanac message indicating a set of transmission points associated with a second node as being collocated and configured to transmit coherent signals;
receiving the coherent signals transmitted from at least two transmission points of the set of transmission points of the second node; and
determining one or more phase difference of arrivals (PDoAs) among the coherent signals, wherein between any two transmission points in the set of transmission points, signals transmitted from the two transmission points are distinguishable from each other in a time domain, a frequency domain, a code domain, or any combination thereof.

18. The method of claim 17,
wherein the almanac message also indicates locations of the set of transmission points, and
wherein the method further comprises determining an angle of departure (AoD) of the received coherent signals based on the one or more PDoAs and the locations of the set of transmission points.

19. The method of claim 18,
wherein the almanac message indicates the locations of the set of transmission points, and
wherein the locations' precision is better than a wavelength of the coherent signals.

20. The method of claim 18, wherein the locations of the set of transmission points indicated in the almanac message are in at least two dimensions.

21. The method of claim 18, wherein the almanac message indicates that the locations of the set of transmission points are such that the set of transmission points are non-uniformly distributed.

22. The method of claim 17, wherein the coherent signals are all signals of a same beam.

23. The method of claim 17, further comprising:
reporting the one or more PDoAs to the network entity.

24. A method of operating a network entity, comprising:
providing, to a first node, an almanac message indicating a set of transmission points associated with a second node as being collocated and configured to transmit coherent signals,
wherein between any two transmission points in the set of transmission points, signals transmitted from the two transmission points are distinguishable from each other in a time domain, a frequency domain, a code domain, or any combination thereof.

25. The method of claim 24,
wherein the almanac message also indicates locations of the set of transmission points,
wherein the method further comprises receiving, from the first node, an angle of departure (AoD) of two or more of the coherent signals received at the first node,
wherein the first node determines the AoD of the received coherent signals based on one or more phase difference of arrivals (PDoAs) and the locations of the set of transmission points.

26. The method of claim 25,
wherein the almanac message indicates the locations of the set of transmission points, and
wherein the locations' precision is better than a wavelength of the coherent signals.

27. The method of claim 25, wherein the locations of the set of transmission points indicated in the almanac message are in at least two dimensions.

28. The method of claim 25, wherein the almanac message indicates that the locations of the set of transmission points are such that the set of transmission points are non-uniformly distributed.

29. The method of claim 24, wherein the coherent signals are all signals of a same beam.

30. The method of claim 24, further comprising:
receiving, from the first node, one or more phase difference of arrivals (PDoAs) among the coherent signals determined by the first node; and determining an angle of departure (AoD) of the coherent signals from the set of transmission points based on the one or more PDoAs and the locations of the set of transmission points.

\* \* \* \* \*